United States Patent [19]
Johnson et al.

[11] Patent Number: 6,052,469
[45] Date of Patent: Apr. 18, 2000

[54] INTEROPERABLE CRYPTOGRAPHIC KEY RECOVERY SYSTEM WITH VERIFICATION BY COMPARISON

[75] Inventors: Donald Byron Johnson, Pleasant Valley, N.Y.; Paul Ashley Karger, Acton; Charles William Kaufman, Jr., Northborough, both of Mass.; Stephen Michael Matyas, Jr., Poughkeepsie, N.Y.; David Robert Safford, Brewster, N.Y.; Marcel Mordechay Yung, New York City, N.Y.; Nevenko Zunic, Wappingers Falls, N.Y.

[73] Assignee: International Business Machines Corporation, Armonk, N.Y.

[21] Appl. No.: 09/133,877

[22] Filed: Aug. 14, 1998

Related U.S. Application Data

[63] Continuation of application No. 08/681,679, Jul. 29, 1996, Pat. No. 5,796,830.

[51] Int. Cl.[7] .............................. H04L 9/08; H04L 9/14; H04L 9/28
[52] U.S. Cl. ........................... 380/286; 380/278; 380/28; 713/171
[58] Field of Search ................................. 380/21, 23, 28, 380/30, 49, 26 B, 278, 286; 713/171

[56] References Cited

U.S. PATENT DOCUMENTS

| | | | |
|---|---|---|---|
| 5,724,425 | 3/1998 | Chang et al. | 380/25 |
| 5,761,305 | 6/1998 | Vanstone et al. | 380/21 |
| 5,848,156 | 12/1998 | Murakami | 380/21 |
| 5,857,022 | 1/1999 | Sudia | 380/23 |
| 5,901,227 | 5/1999 | Perlman | 380/21 |
| 5,933,504 | 8/1999 | Vanstone et al. | 380/30 |

*Primary Examiner*—Tod R. Swann
*Assistant Examiner*—Justin T. Darrow
*Attorney, Agent, or Firm*—William A. Kinnaman Jr.

[57] ABSTRACT

A cryptographic key recovery system that is interoperable with existing systems for establishing keys between communicating parties. The sender uses a reversible key inversion function to generate key recovery values P, Q and (optionally) R as a function of a session key and public information, so that the session key may be regenerated from the key recovery values P, Q and (if generated) R. Key recovery values P and Q are encrypted using the respective public recovery keys of a pair of key recovery agents. The encrypted P and Q values are included along with other recovery information in a session header accompanying an encrypted message sent from the sender to the receiver. The key recovery agents may recover the P and Q values for a law enforcement agent by decrypting the encrypted P and Q values in the session header, using their respective private recovery keys corresponding to the public keys. The R value, if generated, is not made available to the key recovery agents, but is ascertained using standard cryptanalytic techniques in order to provide a nontrivial work factor for law enforcement agents. The receiver checks the session header of a received message to ensure that the sender has included valid recovery information. Only when the receiver has verified that the sender has included valid recovery information does the receiver decrypt the received message.

20 Claims, 11 Drawing Sheets

| COUNTRY | ENCRYPT ALGORITHM | MAXIMUM ALLOWED KEY LENGTH (BITS) | | | PUBLIC KEYS | | | |
|---|---|---|---|---|---|---|---|---|
| | | WITHOUT PQR INTRA-COUNTRY | WITH PQR INTER-COUNTRY | | KEY RECOVERY AGENT 1 | KEY RECOVERY AGENT 2 | ... | KEY RECOVERY AGENT N |
| | | | R= r1 xor r2 | ENTIRE KEY | | | | |
| X | DES | INF. | 40 | 64 | 1FCD38.... | 74901A | | 30FA67 |
| X | RC5 | INF. | 40 | 64 | 1FCD38.... | 74901A | | 30FA67 |
| Y | DES | 128 | 40 | 128 | E52AC3.... | F32AB7 | | 5EF200 |
| Y | RC5 | 128 | 40 | 128 | E52AC3.... | F32AB7 | | 5EF200 |
| Z | DES | 64 | 64 | 128 | 6494FF.... | 66673E | | 342781 |
| Z | RC5 | 64 | 64 | 128 | 6494FF.... | 66673E | | 342781 |
| W | DES | 00 | 00 | 128 | AF88C2.... | CBE8F9 | | 1BF87C |
| W | RC5 | 00 | 00 | 128 | AF88C2.... | CBE8F9 | | 1BF87C |
| . | . | . | . | . | . | . | | . |
| . | . | . | . | . | . | . | | . |

FIG. 12

INTEROPERABLE CRYPTOGRAPHIC KEY RECOVERY SYSTEM WITH VERIFICATION BY COMPARISON

CROSS-REFERENCE TO RELATED APPLICATION

This is a continuation of application Ser. No. 08/681,679, filed Jul. 29, 1996, now U.S. Pat. No. 5,796,830.

BACKGROUND OF THE INVENTION

1. Field of the Invention

This invention relates to a cryptographic key recovery system and, more particularly, to a key recovery system that is interoperable with existing systems for establishing keys between communicating parties.

2. Description of the Related Art

Data encryption systems are well known in the data processing art. In general, such systems operate by performing an encryption operation on a plaintext input block, using an encryption key, to produce a ciphertext output block. The receiver of an encrypted message performs a corresponding decryption operation, using a decryption key, to recover the plaintext block.

Encryption systems fall into two general categories. Symmetric (or private key) encryption systems such as the Data Encryption Standard (DES) system use the same secret key for both encrypting and decrypting messages. In the DES system, a key having 56 independently specifiable bits is used to convert 64-bit plaintext blocks to ciphertext blocks, or vice versa.

Asymmetric (or public key) encryption systems, on the other hand, use different keys that are not feasibly derivable from one another for encryption and decryption. A person wishing to receive messages generates a pair of corresponding encryption and decryption keys. The encryption key is made public, while the corresponding decryption key is kept secret. Anyone wishing to communicate with the receiver may encrypt a message using the receiver's public key. Only the receiver may decrypt the message, however, since only he has the private key. Perhaps the best-known asymmetric encryption system is the RSA encryption system, named after its originators Rivest, Shamir and Adleman.

Asymmetric encryption systems are generally more computationally intensive than symmetric encryption systems, but have the advantage that they do not require a secure channel for the transmission of encryption keys. For this reason, asymmetric encryption systems are often used for the one-time transport of highly sensitive data such as symmetric encryption keys.

Data encryption systems of all types have attracted the attention of government intelligence agencies and law enforcement agencies, since the same cryptographic strength that prevents decryption by unauthorized third parties also prevents decryption by intelligence or law enforcement officials having a legitimate reason for wanting to access the plaintext data. Because of such concerns, governments have either prohibited the use or export of strong encryption systems or have conditioned their approval on the use of weakened keys that are susceptible to key-exhaustion attacks (i.e., systematically testing all possible keys until the right one is found). Such weak encryption systems have the obvious disadvantage that they are just as vulnerable to unauthorized third parties as they are to authorized government officials.

Various cryptographic key recovery systems have recently been proposed as a compromise between the demands of communicating parties for privacy in electronic communications and the demands of law enforcement agencies for access to such communications when necessary to uncover crimes or threats to national security. Generally, in such key recovery systems, all or part of the key used by the communicating parties is made available to one or more key recovery agents, either by actually giving the key portions to the key recovery agents (in which case the key portions are said to be "escrowed") or by providing sufficient information in the communication itself (as by encrypting the key portions) to allow the key recovery agents to regenerate the key portions. Key recovery agents would reveal the escrowed or regenerated key portions to a requesting law enforcement agent only upon presentation of proper evidence of authority, such as a court order authorizing the interception.

The use of multiple key recovery agents, all of which must cooperate to recover the key, minimizes the possibility that a law enforcement agent can improperly recover a key by using a corrupt key recovery agent.

Key recovery systems serve the communicants' interest in privacy, since their encryption system retains its full strength against third parties and does not have to be weakened to comply with domestic restrictions on encryption or to meet export requirements. At the same, key recovery systems serve the legitimate needs of law enforcement by permitting the interception of encrypted communications in circumstances where unencrypted communications have previously been intercepted (as where a court order has been obtained).

In addition to serving the needs of law enforcement, key recovery systems find application in purely private contexts. Thus, organizations may be concerned about employees using strong encryption of crucial files where keys are not recoverable. Loss of keys may result in loss of important stored data.

A number of desirable features of a key recovery system have been identified. Thus, considering first higher-priority features, a key recovery system should be capable of being implemented in software or hardware. It should not require communication with a third party during message creation or connection setup. It should provide interoperability between users in different countries. The algorithms used should be publicly known, and the mechanism should be algorithm independent. The design should be open and should be capable of being implemented by multiple vendors based on published specifications. It should provide a key recovery capability independently for each country. It should provide, in a single system, the flexibility for different levels of security in different environments, and provide the highest level of cryptographic security allowable by law. It should be a modular extension (add-on) to existing cryptographic systems. It should permit any key exchange mechanism to be used, while retaining a control point that enforces compliance with key recovery. The security properties of the exchanged key should be maintained, except for allowing for recovery.

Other features, though of lesser priority, are nevertheless highly desirable. A key recovery system should support both store-and-forward and interactive environments. It should not require communication with a third party for installation (i.e., it should work "out of the box"). It should support the policy option of requiring the collaboration of multiple key recovery agents to recover the key (to provide protection against a corrupt key recovery agent). It should allow an external verifier (without access to the key recovery keys) to have some level of confidence that the parties use an unpatched implementation of this system. (Note that in interactive environments, if both parties encrypt with the same public keys and key recovery information, a third party can check for equality of ciphertexts.) It should prevent a patched (rogue) implementation from interoperating with an unpatched (complying) implementation. It should be hard to subvert the scheme to use it for a bulk data confidentiality channel.

Key recovery systems of various types are described in D. E. Denning and D. K. Branstad, "A Taxonomy for Key Escrow Encryption Systems", *Communications of the ACM*, vol. 39, no. 3, Mar. 1996, pp. 34–40, incorporated herein by reference. Two specific key recovery systems are noted below.

The copending application of D. B. Johnson et al., Ser. No. 08/629,815, filed Apr. 10, 1996, entitled "Cryptographic Key Recovery System", describes a partial key recovery system using multiple key recovery agents. In one version of the system described in that application, the sender generates a set of key recovery values (or key parts) P, Q and (optionally) R. The session key is created by combining the P and Q values by XOR addition, concatenating the result with R, and hashing the concatenation result to generate the key. The P and Q values are then encrypted using the public keys of the respective key recovery agents and the encrypted P and Q values included (along with other recovery information) in a session header accompanying the encrypted message. The R value, if generated, is not made available to any key recovery agent, but is kept secret to provide a nontrivial work factor for law enforcement agents seeking to recover the key.

As is evident from the above description, the key recovery procedure described in the copending application requires the secret session key used for encrypting messages to be established using the mechanism of the key recovery procedure itself. Since users cannot independently specify the session key, the disclosed key recovery procedure is incompatible with existing key agreement procedures.

In another key recovery system, described in PCT patent publication WO 96/05673 (Trusted Information Systems, Inc.), the sender splits a session key into first and second session key portions by setting the first session key portion equal to a random number and setting the second session key portion equal to the XOR product of the random number and the session key. The sender creates a law enforcement access field (LEAF) by encrypting the respective session key portions with the public encryption keys of first and second key recovery agents and concatenating the two encryption products. The sender also creates a LEAF verification string (LVS) by concatenating the original session key portions and encrypts this using the session key to form an encrypted LEAF verification string (ELVS). Finally, the sender transmits an encrypted message, together with the LEAF and ELVS, to the receiver.

Before decrypting the encrypted message, the receiver regenerates the LEAF to verify that the sender has created a proper LEAF that would actually permit recovery of the session key through the key recovery agents. This is done by decrypting the ELVS to obtain the session key portions and then encrypting the respective session key portions with the public encryption keys of first and second key recovery agents. If the receiver succeeds in regenerating the transmitted LEAF in this manner, it concludes that the LEAF is genuine and proceeds to decrypt the message. Otherwise, it concludes that the LEAF is corrupt and does not proceed with the decryption step.

While this latter key recovery system allows the use of arbitrarily generated session keys, it does so by introducing an additional secret quantity (the random number) that the receiver does not have into the key-splitting procedure. Because of this additional secret quantity, the receiver cannot independently regenerate the key portions (to validate the LEAF), but must obtain them as additional information from the sender (by means of the ELVS).

SUMMARY OF THE INVENTION

The present invention contemplates a system for handling key recovery. It enhances the system described in the copending application of D. B. Johnson et al. by permitting users to establish the session key using any desired key distribution or key agreement procedure (e.g., a procedure having the attribute of perfect forward secrecy). The mechanism used to establish the session key is independent of and completely transparent to the cryptographic key recovery procedure. At the same time, the present invention provides a key distribution procedure when lacking.

The present invention contemplates a new key inversion function that permits the P, Q and R values required by the key recovery procedure to be generated from the secret session key (i.e., by working backwards from the key). That is, the session key is an independent variable and the P, Q and R values are dependent variables. By contrast, in the copending application of D. B. Johnson et al. the P, Q and R values are independent variables and the key is a dependent variable (i.e., the key is derived from the P, Q and R values).

One possible solution to the problem (of incompatibility with existing key establishment procedures) would have been to employ a method called "key sharing", or "key splitting", as described in the PCT application mentioned above. As noted above, however, key sharing introduces additional secret variables, which under the key recovery procedure would have to be transmitted securely from the sender to the receiver. The present invention seeks to avoid such a requirement and to eliminate any need for the sender to communicate secret information to the receiver in order that the latter can perform his part of the key recovery procedure. This problem is avoided by constructing a special entropy-preserving key inversion function that permits the P, Q and R values to be computed from the secret session key and public information used by the key recovery procedure.

The difference between the key inversion function of the present invention and key sharing can be further explained. The key inversion function is used to transform a key into an "equivalent representation". The key inversion is based solely on the key as an input and on public parameters. Thus, the key inversion is easy to verify by anyone with access to the key. Also, given an output (i.e., key recovery) value it is easy to verify the key (as verification only needs the output values and the public variables). Key inversion is different from "secret sharing" techniques as it relies solely on the key and public parameters and does not involve further random bits which are used for secret sharing. Thus, when splitting a key into two values (as in the above-identified PCT application), the "entropy" (i.e., the randomness content) of the splits doubles when compared to the initial key. In contrast, the key inversion of the present invention does not increase the "entropy" of the key, as no additional randomness is involved in the inversion mechanism.

Due to this conservation of entropy, the key inversion function of the present invention is in fact invertible, enabling one to start from the key and derive the output values or to start from the output values and derive the key. This is crucial for verification of outputs and their usage; secret sharing techniques do not allow for such verification.

The present invention contemplates sending a session context which contains enough information: (1) to allow the parties to agree on keys, or to employ any independently established keys; (2) to allow the receiver to verify the associated key recovery information; (3) to allow authorized entities the ability to recover components of the keys; and (4) to allow the authorized entities to verify the correctness of the key recovery information given by the key recovery agents.

A secret value can be made available in different ways. It may be encrypted and made available to a third party or it may be encrypted and transmitted with the encrypted data, in which case it must be accessed via electronic means. The examples in this specification describe the latter approach.

The present invention can be implemented as an "add-on" rather than a replacement for existing key distribution schemes. The "add-on" approach allows existing encryption systems to gain the benefits of the present invention (longer keys), while not demanding changes to the existing key distribution component of the system. Thus, one of the principal objects of the present invention is to make it as self-contained and independent as possible, and to minimize the necessary changes to an existing encryption system or application in order to implement key recovery.

The advantages of the present invention may be briefly summarized. It is an add-on solution interoperable with any key distribution procedure, and it provides for key distribution when lacking. It allows recovery of lost cryptographic keys by recovery agents. No user keys are held by key recovery agents. Key recovery agents have no role in generating user keys. It is a multi-way key recovery scheme. It enables strong cryptography world-wide. It addresses the needs of legitimate and authorized law-enforcement, while at the same time addressing inherent weaknesses in other key recovery proposals (e.g., the requirement of an infrastructure to establish a user key or the requirement of a special hardware device). It has no limit on key lengths, nor any algorithm restrictions. It is interoperable with all key exchange mechanisms. Only session encryption keys are recoverable. Key recovery information is made partially available in accordance with policy. A uniform (encryption algorithm-independent) work factor is provided for full key recovery. Since the present invention uses only encryption, it would be hard to subvert the scheme to use it for a bulk data confidentiality channel.

The present invention offers much flexibility. For example, the invention is adaptable and amenable to each country's laws and regulations. It has built-in flexibility for non-escrowed and key escrowed key lengths. For communications between two countries, the escrow rules would default to the lower values of P and R, resulting in the lower work factor. The key management can be done in a variety of ways that are consistent with today's standard industry practices.

The present invention does not attempt to provide detection of two coordinated rogue users. Two users are always able to "do their own thing" outside this system.

The present invention addresses the communication needs of users and authorized key recovery agents located in different countries. It is applicable to a wide variety of cryptographic algorithms and key lengths. For the purpose of this specification, we will use an example of triple DES with a total key length of 168 bits.

The present invention assumes the use of public key cryptography in operating with the key recovery agents. The present invention does not assume the use of public key cryptography for key distribution between users. Although the examples of key distribution in this specification use only public key cryptography (e.g., RSA or Diffie-Hellman key exchange), one could just as well use symmetric key cryptography (e.g., Kerberos). The present invention maintains the secrecy provided by the key distribution mechanism. It only adds a key recovery capability. For example, if the key distribution has perfect forward secrecy, this property is maintained.

This present invention assumes that the public keys of users and key recovery agents are certified. The procedures and mechanisms to achieve such certification are well known in the art and are outside the scope of this system.

Each country can employ multiple key recovery agents. Each key recovery agent has a unique ID.

The key recovery agents' and/or their certifiers' public keys, or secure means for obtaining these public keys, are provided in the client hardware or software using any one of a number of mechanisms. Thus, each key recovery agent may create its own public and private key pair (e.g., RSA keys of 1024 bits) and keep the private key secret while publishing the public key. (The cryptographic equipment should be capable of handling variable key sizes.) This will enable an encryption product to ship with a capability to operate as a turn-key solution "out of the box". A system incorporating the disclosed key recovery system can be pre-configured with a country ID, indicating the country in which the system is located and will operate. A user might also be able to configure the system with other information required by the key recovery procedure.

In a cryptographic product that has only a key recovery capability, the implementation will not permit application programs to circumvent the key recovery system by directly invoking the encryption algorithm. Once invoked, the key recovery system will ensure that the key recovery procedure steps are followed. That is, a key used for data privacy encryption will not be made available to the application program or user until after the procedure steps have been successfully completed.

BRIEF DESCRIPTION OF THE DRAWINGS

FIG. 12 shows a global communications policy table used by the present invention.

DESCRIPTION OF THE PREFERRED EMBODIMENTS

General Environment

Figure 1:
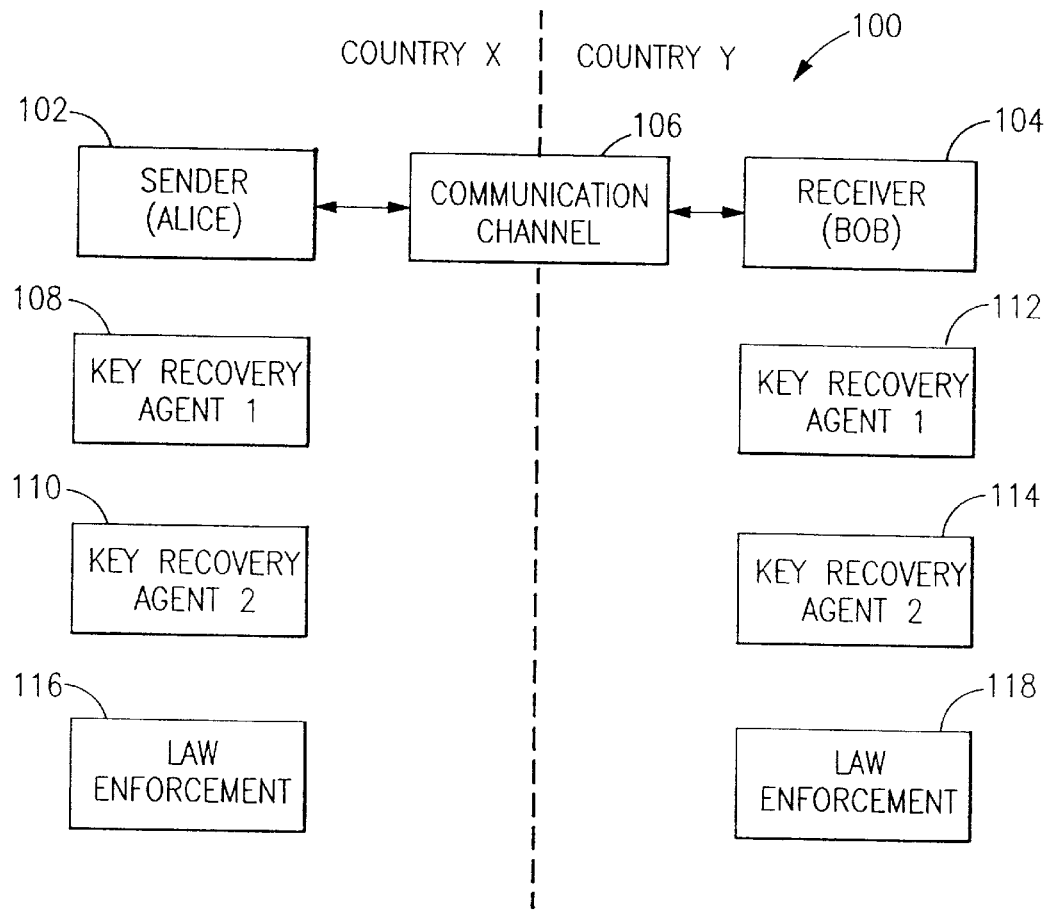
FIG. 1 is a schematic block diagram of a communication system in which the present invention may be used.

FIG. 1 shows a communication system 100 in which the present key recovery system may be used. In system 100, a sender 102 ("Alice") in country X communicates with a receiver 104 ("Bob") in country Y by transmitting one or more encrypted messages (making up a communications session) over a communication channel 106. Sender 102 and receiver 104 may each comprise computer workstations, suitably programmed to provide the encryption and key recovery functions described below. Although the example of FIG. 1 assumes that the sender 102 and receiver 104 are located in different countries (X and Y), the invention may also be used entirely within a single country.

The transmitted messages are encrypted by the sender 102 using a session encryption key and decrypted by the receiver 104 using a corresponding session decryption key. If a symmetric encryption scheme (e.g., DES) is used, then the session encryption key (which is also the session decryption key) is the "secret" session key for the purposes of key recovery. On the other hand, if an asymmetric encryption scheme (e.g., RSA) is used, then the private session decryption key is the "secret" session key for the purposes of key recovery, as described further below.

A pair (in this particular example) of key recovery agents 108 and 110 are selected in country X, while a pair of key recovery agents 112 and 114 are selected in country Y. It is contemplated that the establishment of key recovery agents could take place as part of the establishment of a general public key infrastructure.

Communications over communication channel 106 are assumed to be subject to interception by third parties, including respective law enforcement agents 116 and 118 in countries X and Y. Non-governmental third parties intercepting the encrypted communications will be unable to decipher the communications unless they successfully use one or more cryptanalytic techniques. On the other hand, a law enforcement agent 116 or 118 having proper authority will be able to recover a session key, using the key recovery agents 108, 110 or 112, 114 for his country as described below.

Key Inversion Function: General Form

Figure 2:
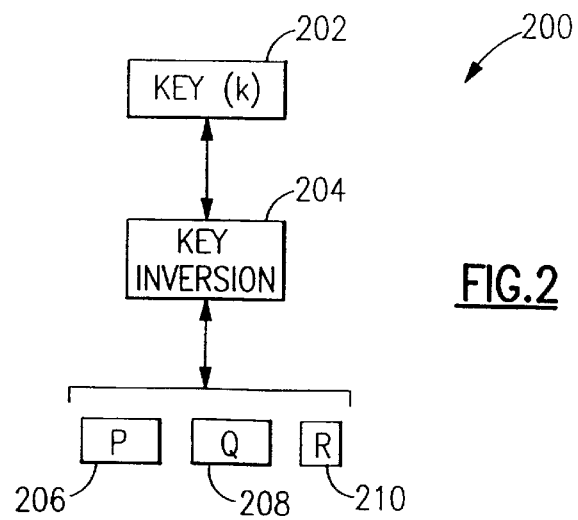
FIG. 2 is a schematic block diagram of the general key inversion scheme of the present invention as performed for a particular country.

FIG. 2 shows the general key inversion scheme 200 of the present invention as performed for (say) country X. Sender 102 invokes a key inversion function 204 to generate a pair of shared key recovery values P and Q (206, 208) and, optionally, a nonshared key recovery value R (210) as a function of a secret session key K (202) and public information.

As described more fully below, the sender 102 makes shared key recovery values P and Q available to the first and second key recovery agents 108, 110 for country X by encrypting them with respective public recovery keys of the key recovery agents to generate encrypted key recovery values P' and Q'. The sender 102 includes the encrypted key recovery values P' and Q' in a header accompanying at least a first message to the receiver 104 over communication channel 106. On the other hand, nonshared key recovery value R (if generated) is not revealed to any third party.

Key inversion function 204 is invertible in the sense that: (1) it provides a one-to-one mapping between the key K and the generated key recovery values; and (2) the key K can easily be regenerated from the generated key recovery values by inverting the function. If the generated key recovery values include only P and Q (i.e., R is not generated), then the key K is completely determined by P and Q and can be trivially regenerated given knowledge of these values. If the generated key recovery values also include R, then the key is completely determined only by P, Q and R, and cannot be trivially determined from only P and Q. However, the number of possible R values generated by key inversion function 204 is made low enough that a law enforcement agent knowing P and Q can feasibly regenerate the key K by exhausting the space of possible R values, as described below. The work factor required to ascertain R is intended to discourage routine decryption of messages by law enforcement, even if it obtains the P and Q values.

To decipher a message that it has intercepted, a law enforcement agent 116 extracts the encrypted key recovery values P' and Q' from the session header and presents them to key recovery agents 108, 110, together with evidence of proper authority (such as a court order). Upon satisfying themselves of the law enforcement agent's authority, the key escrow agents 108, 110 decipher the encrypted key recovery values using their private decryption keys and give the recovered values P and Q to the law enforcement agent 116. The law enforcement agent then generates successive trial values of R and supplies them together with the recovered P and Q values as inputs to the key inversion function 204 until the original session key K is recovered.

Key Inversion Function: Specific Implementations

Figure 3A:
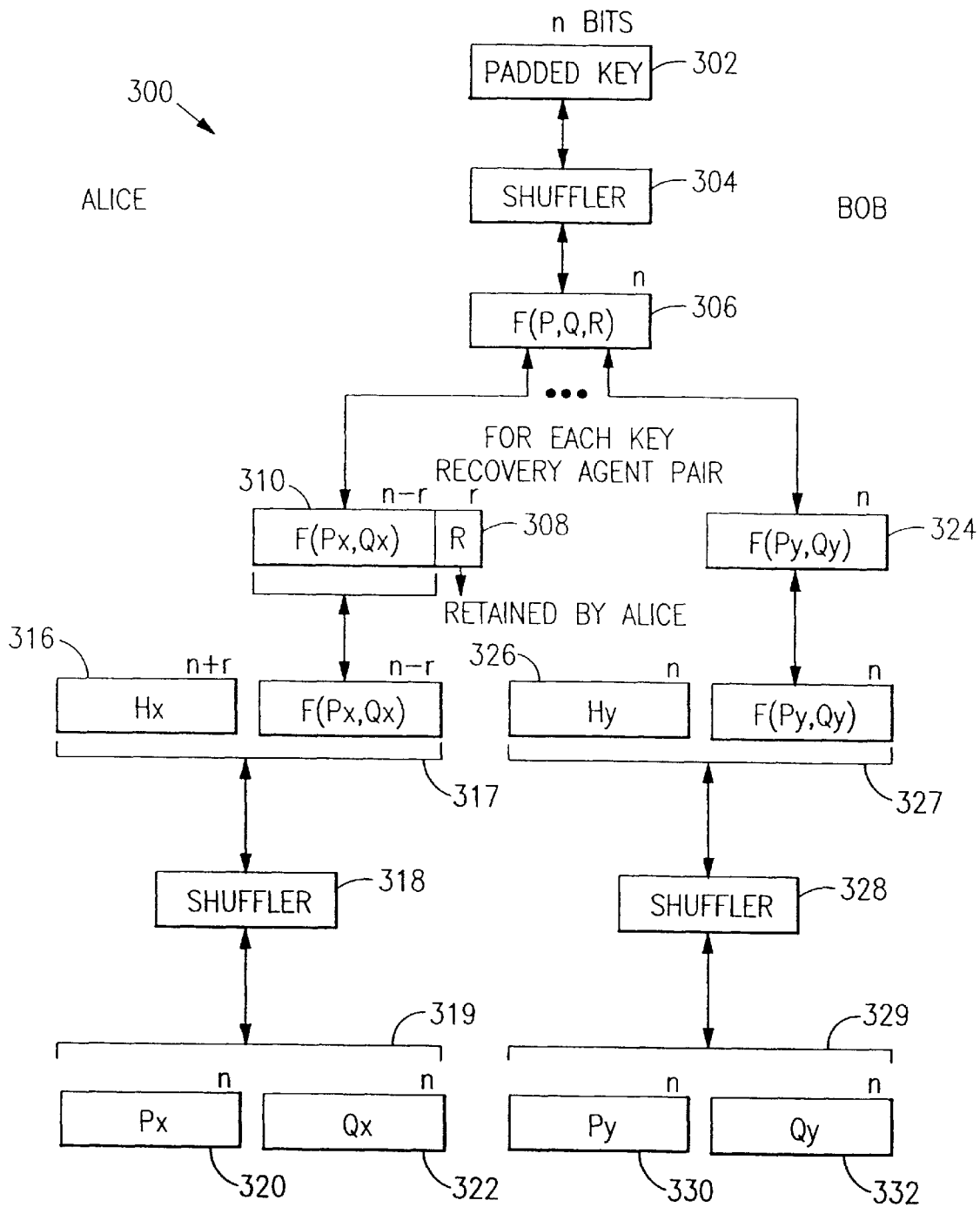
FIG. 3A is a schematic block diagram of an exemplary key inversion function for generating key recovery values from a session key.

FIG. 3A shows an exemplary key inversion function 300 for generating key recovery values P, Q and R from a session key K or vice versa. While the exemplary key inversion function 300 generates P and Q values for two key recovery agents per user, the key inversion function can produce any number of outputs to handle the case where the sender and receiver each have more than two key recovery agents or only a single key recovery agent.

Key inversion function 300 requires the following inputs: (1) the key K; (2) the length of the key K in bits; (3) the length of R in bits, denoted r; and (4) recovery information 610 (FIG. 9) to be described, including the first and second key recovery agent IDs 912, 916, 922, 926 for the communicating parties 102, 104.

The original key K is preprocessed by padding up to 15 zero bits onto the most significant bit positions to form a processed key 302 of n bits, where n is a multiple of 16. The example of FIG. 3A illustrates the case of a sender, in country X, who makes use of an r-bit R value and a receiver, in country Y, who uses an R of 0 bits.

The n-bit padded key 302 is processed with a first invertible "shuffler" function 304 (described further below) to produce an n-bit output value 306 denoted F(P,Q,R). Every bit in F(P,Q,R) depends pseudorandomly on all key bits. F(P,Q,R) is a representation or altered form of the key K.

The sender's agents' Px and Qx values are produced from F(P,Q,R) as follows. Any r bits of F(P,Q,R) (e.g., the least significant r bits) are defined as the value R (308). The remaining n−r bits of F(P,Q,R) (e.g., the most significant n−r bits) are defined as a first input value (to the shuffler function to be described) F(Px,Qx) (310). An (n+r)-bit second input value Hx (316) is prefixed to the (n−r)-bit first input value F(Px,Qx) (310) to create a 2n-bit lengthened input value 317. Lengthened input value 317 is then processed with a second invertible shuffler function 318 to produce a 2n-bit output value 319. Finally, output value 319 is partitioned into subportions consisting of an n-bit value Px (320) and an n-bit value Qx (322). Shuffler function 318 is similar to shuffler function 304 except for the length of the input and output values 317 and 319; the number of bits in Hx guarantee that the final input to the shuffler function 318 is always an even number of bytes (regardless of the number of key recovery agents).

The (n+r)-bit value of Hx (316) is computed as follows. The sender's first and second key recovery agent IDs 912 and 916 (FIG. 9), the hash value H(T1) computed on the recovery information (T1) 610 (FIG. 9), F(P,Q,R), and a public header are concatenated together, in a predetermined order (e.g., in the above order), to form a data block denoted D1:

D1=(sender's 1st key recovery agent ID∥sender's 2nd key recovery agent ID∥H(T1)∥F(P,Q,R)∥Public Header)

Figure 9:
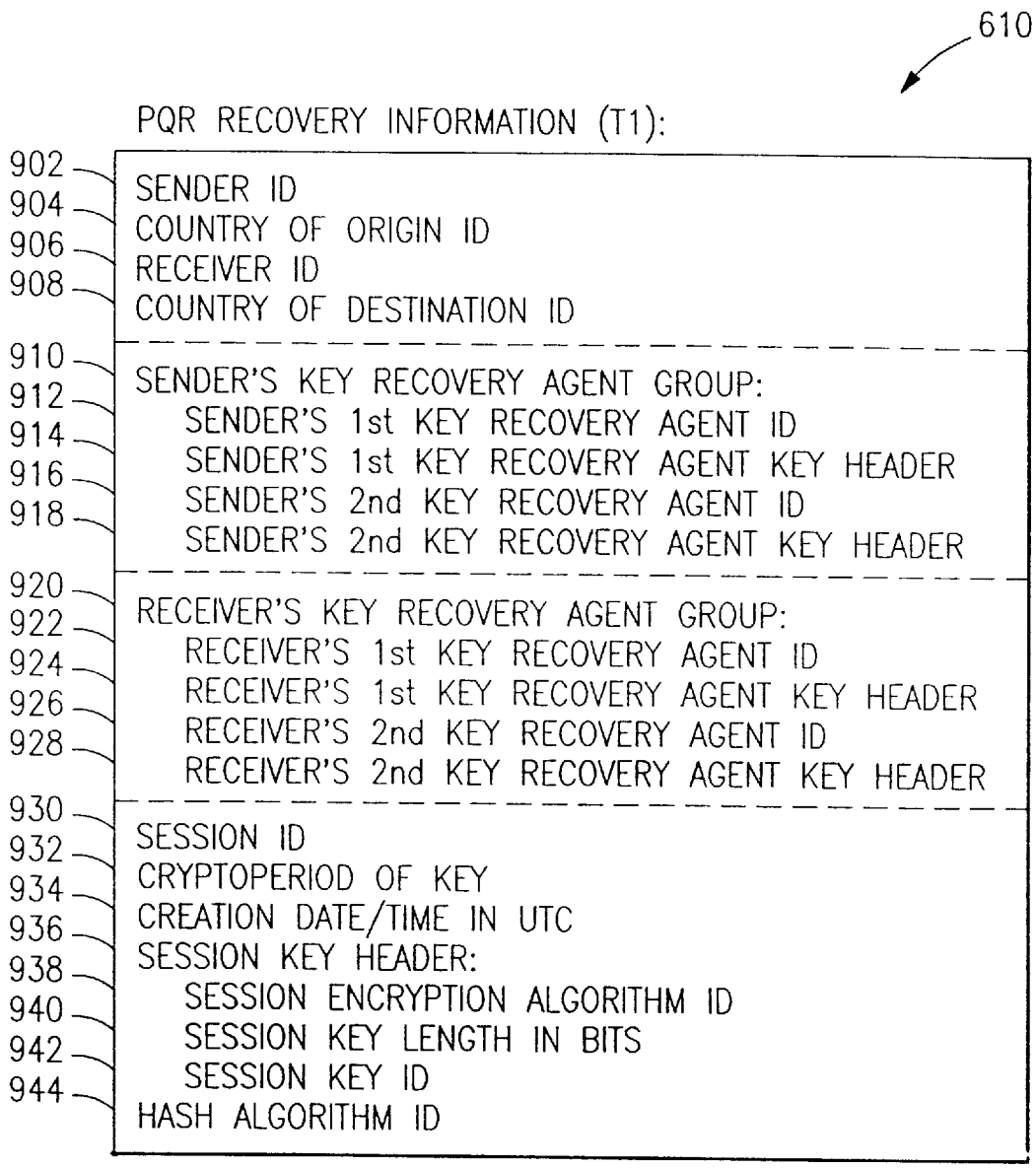
FIG. 9 is a schematic block diagram of the recovery information in a session context.

Recovery information 610 (denoted T1) is defined and described in FIG. 9; the sender's first and second key recovery agent IDs 912 and 916 are part of this key recovery information. Public Header is an 8-byte structure defined as follows:

1 byte Identifier: Data to be hashed="PQ Key Recovery Agent IDs"

1 byte Counter: 0, 1, 2, etc.

6 bytes Reserved: Set to 0

The data block D1 (with Counter in the public header initially at zero) is hashed to produce a hash value H(D1). If the length of H(D1) is less than n+r, then successive hashes are concatenated together (with Counter being incremented for each subsequent hash) until the resultant length is greater than or equal to n+r. Hx is defined as the least significant n+r bits. This technique prevents the workload factor from being reduced for high R lengths.

The values Px (320) and Qx (322) are the most significant and least significant n bits, respectively, in the generated 2n-bit output 319 from shuffler function 318. Px (320) is the value encrypted with the public key of the sender's first key recovery agent 108. Qx (322) is the value encrypted with the public key of the sender's second key recovery agent 110.

The receiver's agents' Py and Qy values are produced from the original key in a similar manner, as follows. Since the receiver 104 has no R value (in this example), the entire F(P,Q,R) value 306 is defined as the n-bit first input value F(Py,Qy) (324). An n-bit second input value Hy (326) is prefixed to the n-bit first input value F(Py,Qy) to create a lengthened input value 327. The lengthened input 327 is then processed with a shuffler function 328 (similar to the previously described shuffler functions) to produce a 2n-bit output value 329, which is partitioned into an n-bit Py (330) and an n-bit Qy (332). Hy is computed in a manner similar to that of Hx, except that in forming the data block (here denoted D2) the receiver's first and second key recovery agent IDs 922, 926 (FIG. 9) are used instead of the sender's first and second key recovery agent IDs 912, 916.

The particular key recovery agent that is designated as the first or second key recovery agent for a given party is determined by the order in which their IDs appear in recovery information 610 (FIG. 9). The sender's first and second key recovery agent IDs 912, 916 and the receiver's first and second key recovery agent IDs 922, 926 are each arranged in sorted order within recovery information 610. Thus, the process of generating the P, Q, R and salt values (as described below) and building data structures is entirely a deterministic process.

Key inversion function 300 is an entropy-preserving function in that the P, Q and R values generated by it are derived from the secret key K and other, public information. That is, the number of key combinations is the same as the number of P-Q-R combinations. In a secret sharing scheme, the entropy increases with the number of splits needed to recover the original key.

The key inversion function 300 involves the entire key K in the process of computing the P, Q and R values. Thus, even if one were able to learn the value of (say) P, it would not be possible to execute the key inversion function, either in the forward or backward direction, to exhaustively determine Q with a workfactor less than the workfactor to exhaustively determine the key K.

There is no need for the sender 102 to communicate secret protocol information to the receiver 104. The only secret value that the receiver 104 needs in order to validate the encrypted P and Q values is the secret session key K. Optionally, the sender 102 has a secret signature generation key and the receiver 104 has a validated copy of the sender's public verification key. Beyond that, the sender 102 and the receiver 104 do not need any special keys established between them in order to carry out the encryption procedure of the present invention.

The present invention brings uniformity to the work factor (as seen by law enforcement) for all cryptographic key types. Furthermore, the work factor is consistent for all types of encryption algorithms. That is, a 40-bit work factor is consistently 40 bits for DES, public keys, RC2/4/5, or any other algorithm.

Key inversion function 300 has the additional benefit that it accommodates situations where the secret key K is not an independent random variable (e.g., an RSA secret key). For example, if the public key is a fixed constant (e.g., $2^{16}-1$), then the secret key is a dependent variable. Such a secret key could not be generated from independent P, Q and R values. It would be necessary to generate the P, Q, and R values from the secret key, using a key inversion function.

The procedure 300 of FIG. 3A can be extended to handle an arbitrary number of key recovery agents. For example, if the sender 102 has three key recovery agents, then an Hx of 2n+r bits is prefixed to F(Px,Qx). In such a case, the data block D1 has three key recovery agent IDs concatenated together instead of two. In general, if there are k key recovery agents, then (k−1)n+r bits are prefixed to F(Px,Qx). In such a case, the data block D1 has k key recovery agent IDs concatenated together instead of two. Similarly, if the receiver 104 has three key recovery agents, then an Hy of 2n bits is prefixed to F(Py,Qy); r does not appear in the equation for the receiver since the receiver has no R value. If the receiver 104 has k key recovery agents, then an Hy of (k−1)n bits is prefixed to F(Py,Qy). The receiver's data block D2 is also modified by including the necessary additional key recovery agent IDs.

If there is only one key recovery agent (e.g., the sender 102 in country X uses only one key recovery agent), then the procedure is modified slightly. The P and Q values are computed in the same way as when two key recovery agents are involved, except that the value of Hx prefixed to F(Px, Qx) (FIG. 3A) is computed slightly differently. In this case, the data block D1=(1st key recovery agent ID‖1st key recovery agent ID‖H(T1)‖F(P,Q,R)‖Public Header) is hashed to produce a 160-bit hash value H(D1). If H(D1) is less than n, then a counter is used with subsequent hashes of H(D1) as described above until the resultant length is greater than or equal to n. This technique prevents the workload factor from being reduced for high R lengths. The same process would be used in the event that the receiver 104 had only one key recovery agent. In that case, Hy is computed similarly to Hx, but the receiver's agent ID is substituted for the sender's.

The number of key recovery agents can vary from country to country or from application to application. For example, the sender could use two key recovery agents and the receiver could use one or three key recovery agents.

To recover a session key K, a law enforcement agent 116 or 118 (FIG. 1) performs the key inversion function 300 in reverse to generate the key from the P and Q values. This requires shuffler functions 308, 318, 328 to be executed in the reverse direction, as described below. Further processing is performed on the recovered Hx or Hy value. Once the key K has been recovered, the salt values used to encrypt P and Q (as described below) are recalculated, and the encrypted P and Q values are regenerated and checked for equality with the intercepted encrypted P and Q values.

The key recovery operation will be further described, using country X as an example. Referring to FIG. 3A, the first operation to be performed is to "unshuffle" Px (320) and Qx (322) (i.e., perform shuffler function 318 in reverse) to provide Hx (316) and F(Px,Qx) (310). The next step requires an exhaustive search on R (308). The correct R can be detected with extremely high probability by calculating Hx based on the candidate R and matching the result to the unshuffled Hx. Given F(Px,Qx) (310) and R (308), the quantity F(P,Q,R) (306) is unshuffled (by performing the shuffler function 304 in reverse) to obtain the padded key 302.

Figure 3B:
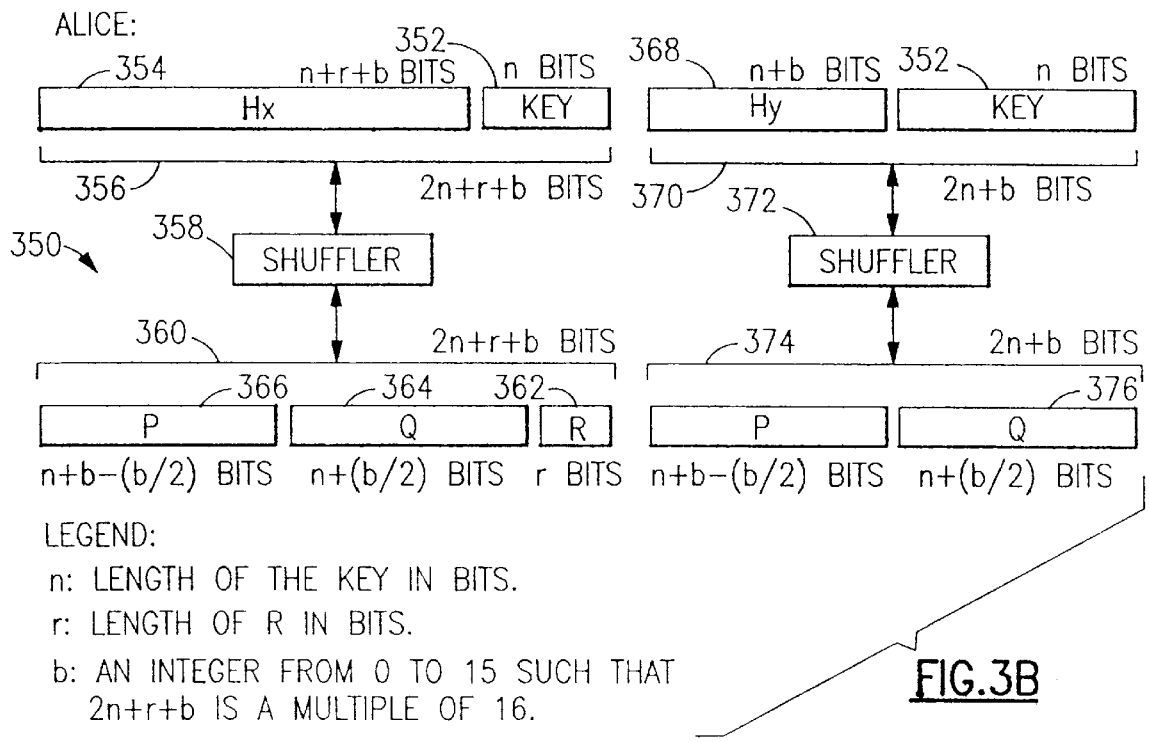
FIG. 3B is a schematic block diagram of an alternative key inversion function for generating key recovery values from a session key.

FIG. 3B shows an alternative implementation 350 of the key inversion function in which there is only one shuffling operation for each country and in which all three key recovery values P, Q and R are generated at the same stage of the procedure.

In this alternative implementation, the sender's agents' Px and Qx values are produced from a original n-bit key K (352) as follows. An (n+r+s)-bit value Hx (354) (computed as Hx value 316 was above) is prefixed to the n-bit key 352 and the resulting (2n+r+s)-bit input value 356 is processed with a shuffler function 358 to produce a (2n+r+s)-bit output value 360; s is an integer from 0 to 15 such that 2n+r+s is a multiple of 16. The output value 360 is then divided into an r-bit R value 362, an (n+s/2)-bit Q value 364, and an (n+s−s/2)-bit P value 366, where s/2 is defined as being the integer component of a fractional value. For all practical purposes, P denotes the output bits that remain after Q and R have been extracted. The extraction method guarantees that all bits in the output are allocated among the values P, Q and R and that P and Q differ in length by at most one-bit.

The sender's agents' Py and Qy values are produced from the original key (K) 352 as follows. An (n+s)-bit value Hy (368) (computed as Hy value 326 was above) is prefixed to the n-bit key 352 and the resulting (2n+s)-bit input value 370 is processed with a shuffler function 372 to produce an (n+s)-bit output value 374. The variable r has been dropped from the equations since r=0, while b is an integer from 0 to 15 such that 2n+s is a multiple of 16. The output value 374 is then divided into an (n+s/2)-bit Q value 376 and an (n+s−s/2) bit P value 378, where s/2 is defined as above. For all practical purposes, P denotes the output bits that remain after Q has been extracted. The extraction method guarantees that all bits in the output 360 are allocated among P and Q and that P and Q differ in length by at most one bit.

Communication Procedure

Figure 4:
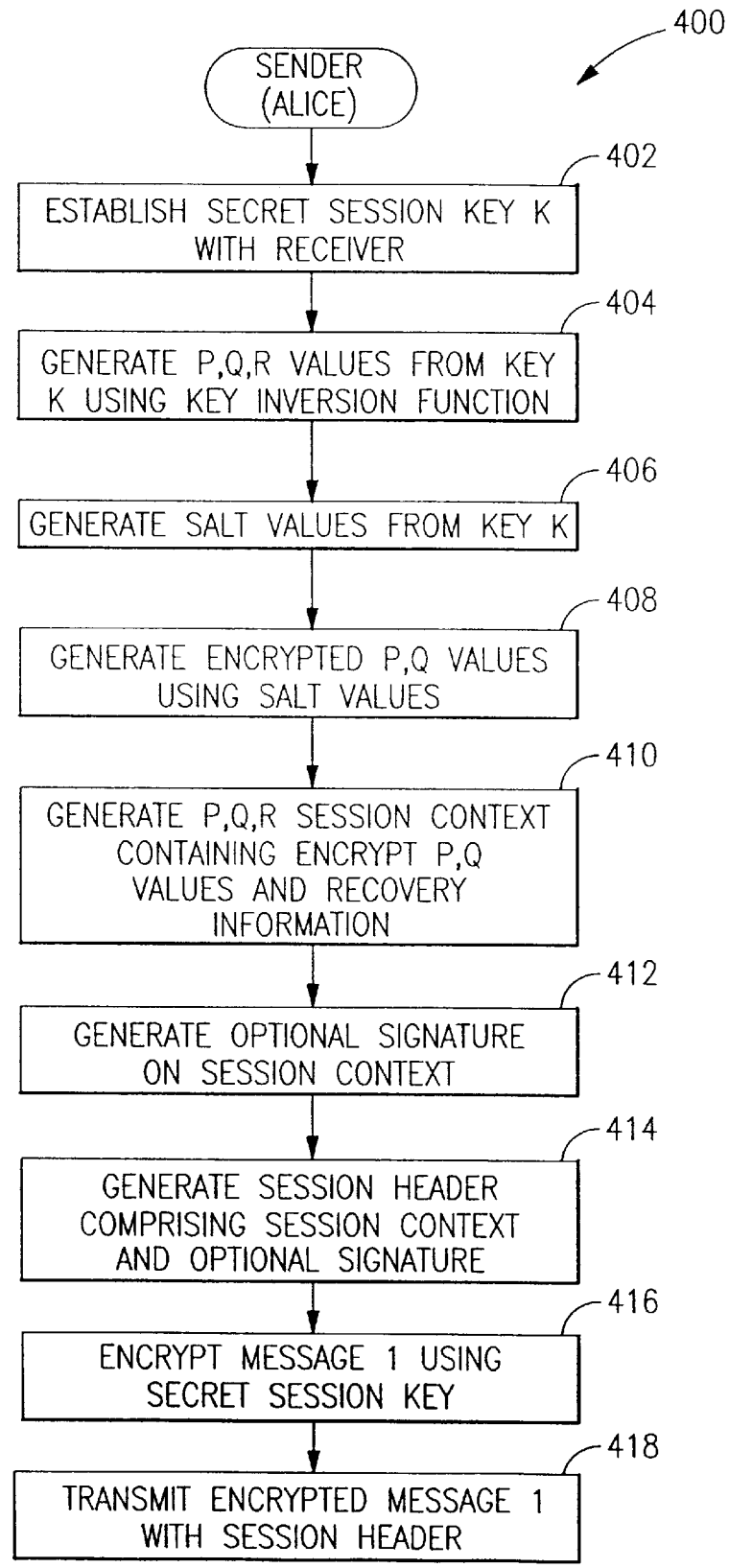
FIG. 4 is a flowchart of the procedure used by a sender who wishes to send encrypted messages to a receiver using an independently established session key.

FIG. 4 illustrates the procedure 400 used by a sender 102 (FIG. 1) in country X who wishes to send encrypted messages to a receiver 104 in country Y using an independently specified session key. The inputs to the procedure 400 are (1) a secret key; (2) an application-specific portion of the recovery information; and (3) an optional secret random salt. A salt is a random value used to increase the randomness of a plaintext. A salt is used only once. If a secret random salt is provided to the procedure, then it will be called SALT0. Otherwise, SALT0 is derived pseudorandomly from the specified secret key, as described below.

Referring to FIG. 4, the sender 102 and receiver 104 first establish a secret session key K (step 402). The sender 102 and receiver 104 may use whatever key distribution or key agreement procedure that they desire for establishing the key K. Typically the session key K will be a symmetric encryption key that is used both by the sender 102 to encrypt messages for the receiver 104 and by the receiver to decrypt messages from the sender. If public keys are used as session keys, then the procedure may be used by defining K=(PKa, SKa), where PKa is the public encryption key used by the sender 102 and SKa is the corresponding secret decryption key used by the receiver 104.

The sender 102 then generates the P and Q values for the first and second key recovery agents 108, 110 in country X (the sender's key recovery agents), as well as those for the first and second key recovery agents 112, 114 in country Y (the receiver's key recovery agents), using the secret session key K and key inversion function 300 (FIG. 3A) (step 404). Although the present example shows only two key recovery agents per country, any number of key recovery agents may be employed, as noted in the description of the key inversion function 300. The sender 102 then generates several salt values, using the secret session key K, in a manner to be described below (step 406).

Figure 6:
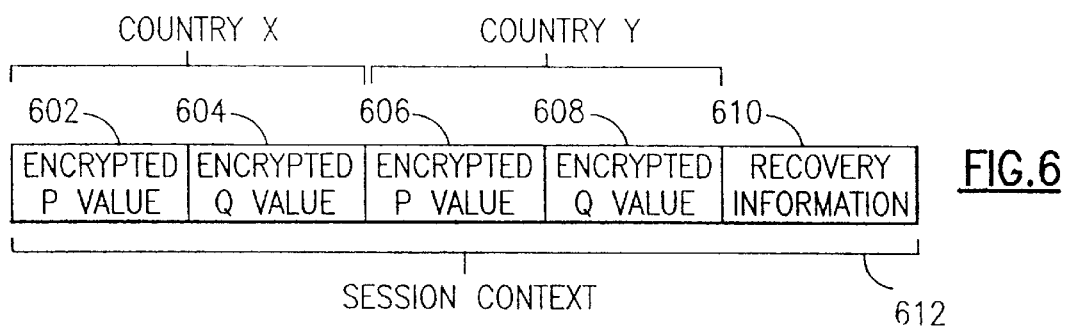
FIG. 6 is a schematic block diagram of the session context of a message header.

Referring to FIG. 6, the sender 102 uses the generated salt values, together with the public keys of the key recovery agents 108–114 and other information, to generate encrypted P and Q values 602, 604 for country X and encrypted P and Q values 606, 608 for country Y (step 408). Using this information, the sender 102 creates a session context 612 (FIG. 6) consisting of the concatenation of encrypted P and Q values 602–608 and recovery information 610 (step 410).

Figure 7:
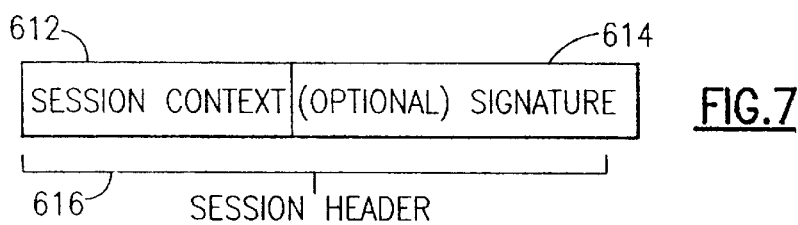
FIG. 7 is a schematic block diagram of the session header of a message packet.

Referring to FIG. 7, the sender 102 then generates a digital signature 614 on the session context 612 using a private signature key (step 412). This is done in the usual manner by generating a hash of the session context 612 and encrypting this hash using the sender's private signature key. Session context 612 and the signature 614 on the context are then concatenated to form a session header 616 (step 414). Digital signature 614 permits the receiver 104 to validate the session context 612 using a validated copy of the sender's public verification key. Digital signature 614 is only optional, however, and may be omitted from the session header 616 if desired.

Figure 8:
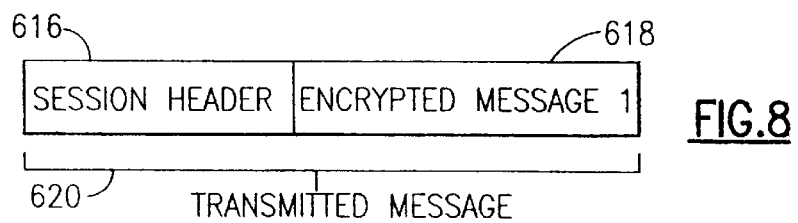
FIG. 8 is a schematic block diagram of a message packet.

Referring to FIG. 8, the sender 102 then encrypts a first message (message 1) with the session key K to generate an encrypted first message 618 (step 416). Finally, the sender 102 sends the receiver 104 a packet 620 made up of the session header 616 and the encrypted first message 618 (step 418).

Figure 5:
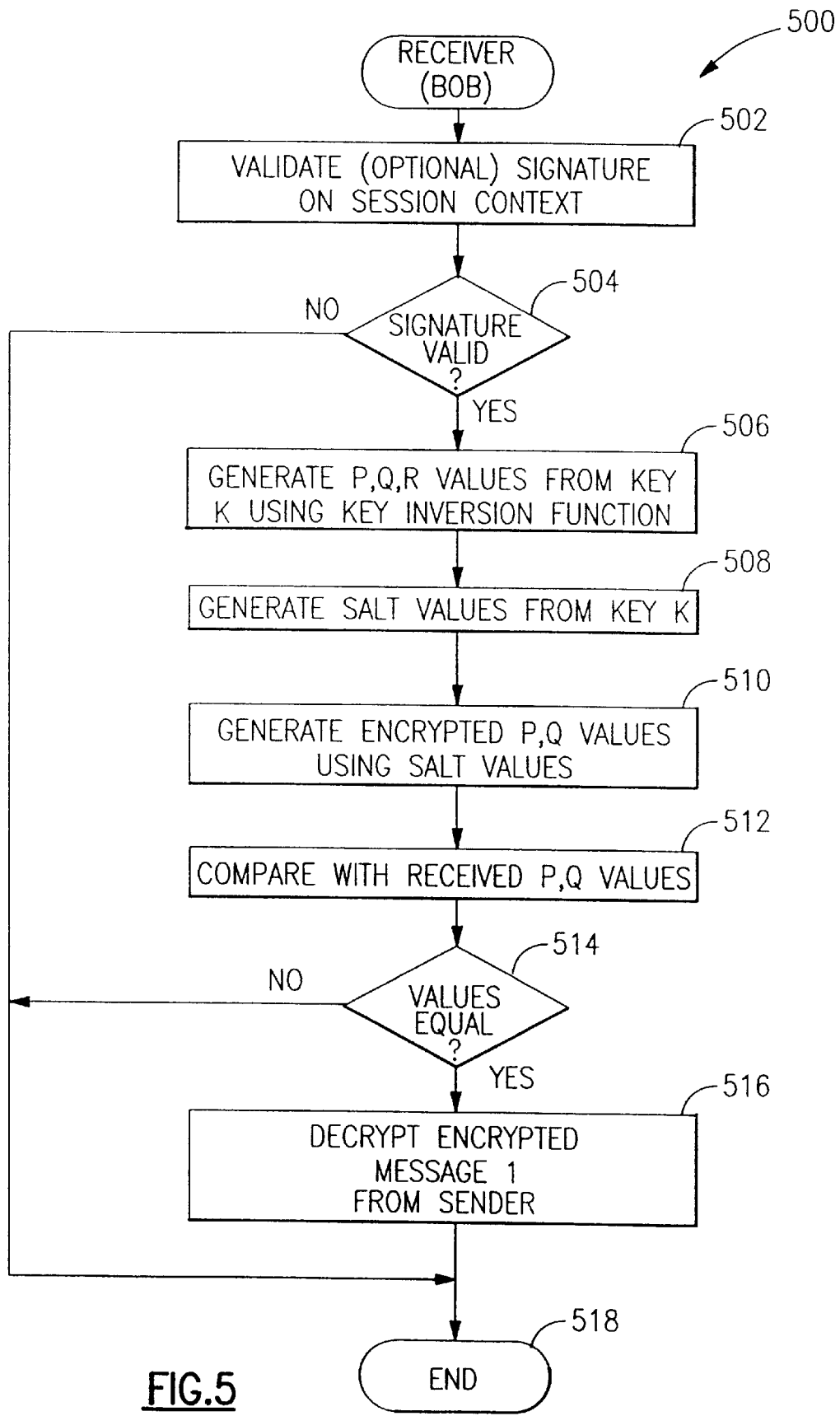
FIG. 5 is a flowchart of the procedure followed by a receiver upon receiving a message packet from the sender.

FIG. 5 shows the procedure 500 followed by the receiver 104 upon receiving message packet 620 from the sender 102.

If the session header 616 includes a signature 614 on the session context 612, the receiver 104 first validates the signature using the sender's public verification key (step 502). This is done in the usual manner by generating a hash of the session context 612 using the same hash function as the sender, decrypting the signature 616 using the sender's public verification key, and comparing the two results for equality. If the two results do not match (step 504), this indicates that either the session context 612 or the signature 614 has become corrupted during transmission, and the receiver 104 terminates without further processing of the message (step 518). Otherwise, or if signatures are not used, the receiver 104 proceeds to the next step.

Following signature validation, the receiver 104 validates the received encrypted P and Q values 602–608 by duplicating the steps performed by the sender 102. Thus, the receiver 104 generates P, Q and R values from the secret session key K (step 506), generates salt values from the key K (step 508) and generates encrypted P and Q values from the salt values (step 510), with steps 506–510 being identical to the steps 404–408 performed by the sender 102. The receiver 104 then compares the encrypted P and Q values thus generated for equality with the set of encrypted P and Q values 602–608 received from the sender 102; the receiver also checks the recovery information 610 received from the sender for consistency with the similar information maintained by the receiver (step 1108).

If the encrypted P and Q values 602–608 and recovery information 606 received from the sender 102 are successfully validated (step 514), the receiver 104 proceeds to the final step of enabling the secret session key K to be used to decrypt the first message (step 516). Otherwise, the receiver 104 terminates the procedure without further processing of the message (518), since it cannot verify that the values 602–610 necessary for key recovery have been transmitted.

In the procedure described above (FIGS. 4–5), it was assumed that the sender 102 and receiver 104 have established a secret session key K beforehand, using an arbitrary key transport or key agreement procedure. Alternatively, the key K may be generated by the sender 102 without the involvement of the receiver 104 and included as part of the transmission packet 620. The modifications entailed in the procedure with key establishment will now be described.

Here it is assumed that no secret value is shared between the sender and the receiver. The input to the system is now (1) the receiver's public key to be used for transmission of the key from the sender to the receiver; and (2) an application-specific portion of the recovery information. In this case, the key recovery system generates the secret session key K and a random secret SALT0.

The sender 102 encrypts the session key K using the public key of the receiver 104 and includes the encrypted session key as an additional part (not shown) of the session context 612. The session key K is encrypted as the value:

K'=ePUb(H(T1); K; SALT0; SALT)

where K' is the encrypted session key; PUb is the public key of the receiver 104; H(T1), K and SALT0 are as defined before; and SALT is an additional 160-bit secret random value that is not correlated with SALT0 or K. SALT assures the security of K and SALT0 exchanged between the parties. Preferably, K is encrypted using the encryption procedure (described below) used to encrypt the P and Q key recovery values.

The receiver 104 recovers the session key from the session context 612 by decrypting it using its private decryption key following the signature validation step (504–506). Otherwise, the same procedure is used as shown in FIGS. 4–5.

Recovery Information

Referring to FIG. 9, recovery information 610 is provided (1) so that the receiver 104 can validate the encrypted P and Q values 602–608 for each key recovery agent 108–114 and (2) so that the key recovery agents can perform consistency checking on decrypted P and Q values.

The sender ID 902 enables the receiver 104 to obtain the public key certificate needed to validate the optional signature 614 generated by the sender 104 on the session context 612. The receiver ID 906 enables the receiver 104 to determine that the message 620 is indeed intended for him or her. The country of origin ID 904 and country of destination ID 908 permit the receiver 104 to validate the contents of the session context 612 by reproducing equivalent encrypted P and Q values and comparing then for equality with the received encrypted P and Q values 602–608.

The sender's key recovery agent group 910 consists of the sender's first key recovery agent ID 912, the sender's first key recovery agent header 914, the sender's second key recovery agent ID 916, and the sender's second key recovery agent header 918. The receiver's key recovery agent group 920 consists of the receiver's first key recovery agent ID 922, the receiver's first key recovery agent header 924, the receiver's second key recovery agent ID 926, and the receiver's second key recovery agent header 928.

The sender's and receiver's first and second key recovery agent IDs 912, 916, 922, 926 permit the receiver 104 to validate that bonafide key recovery agents have been used in accordance with the key recovery procedure. They also permit the public key certificates for each of the key recovery agents to be obtained. The key recovery agent IDs also enable law enforcement to know which key recovery agents are capable of decrypting a user's P and Q values. The default key recovery agent IDs for each user could be carried in an extension to the X.509 version 3 certificate.

Figure 10:
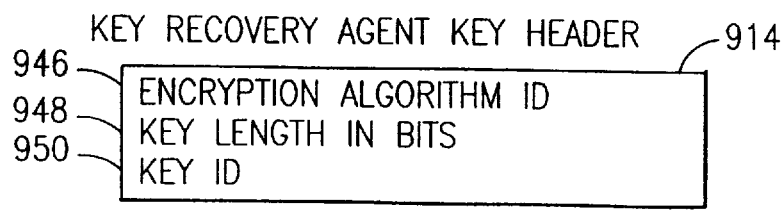
FIG. 10 is a schematic block diagram of a key recovery agent key header in the session context of FIG. 9.

The sender's and receiver's first and second key recovery agent key headers 914, 918, 924, 928 contain information on the public keys belonging to the key recovery agents. Referring to FIG. 10, each key header contains an encryption algorithm ID 946 (specifying the public key algorithm to be used), the key length 948 in bits of the public key, and a key ID 950. The key ID 950 permits the receiver to determine the public keys under which the P and Q values are encrypted. The receiver needs these public keys in order to validate the encrypted P and Q values 602 and 604. The key IDs 950 permit the key recovery agents to determine the public keys under which the P and Q values are encrypted, and hence the private keys needed to decrypt the P and Q values.

The unique session ID 930 permits the sender and receiver to identify the session.

The cryptoperiod 932 of the key is specified by a starting and ending date/time for the use of the key. The P or Q value will not be released unless the period of the court order overlaps a portion of the cryptoperiod of the key. The key recovery system will enforce relatively short cryptoperiods (e.g., less than one day), which may be a policy decision of a country. This helps ensure that the session context is set up dynamically and is transmitted between the sender and receiver. It also ensures better security due to frequent key exchange.

Creation date/time 934 denotes that date and time (UTC encoded) when the session context was created. The receiver will check the date/time 934 as part of consistency checking. The date/time must fall within the period of the court order in order to access the P or Q value.

The session key header 936 contains a session encryption algorithm ID 938, session key length 940 in bits, and a session key ID 942. The session key length 940 is needed by the government in case it is necessary to recalculate the key from the P and Q values. The session encryption algorithm ID 938 is needed by the government in case it is necessary to exhaustively compute R.

The crypto algorithm ID enables the key recovery procedure to be parameterized. That is, the sizes of P, Q, and R can be made to depend on the cryptographic algorithm used for data encryption.

Recovery information 610 may originate from various sources. Thus, the key headers 914, 918, 924, 928 and the cryptoperiod 932 may be stored in a policy table 1200 (FIG. 12) to be described below. The creation date/time 934 may originate from the encryption system itself. The key recovery agent IDs 912, 916, 922, 926 and the hash ID may originate from the application or be pre-configured, while the remaining entries may originate from the application.

Encryption of P and Q Values

The procedure for generating the encrypted P and Q values 602–608 (steps 408 and 510) will now be described.

In what follows, the encryption of input X with key K is denoted eK(X), where "e" denotes encryption and eK(X)=Y is the output. The decryption of Y with key K is denoted dK(Y), where "d" denotes decryption. In public key cryptography, a public and private key pair (PU, PR) is used to encrypt/decrypt. The encryption of input X with the public key PU is denoted ePU(X). The decryption of Y with the private key PR is denoted dPR(Y).

The encrypted P and Q values 602-608 are defined as follows:

Px'=ePUx1(H(T1); Px; SALT<for Px>)

Qx'=ePUx2(H(T1); Qx; SALT<for Qx>)

Py'=ePUy1(H(T1); Py; SALT<for Py>)

Qy'=ePUy2(H(T1); Qy; SALT<for Qy>)

where:

PUx1 is the public key of key recovery agent 1 for country X;

PUx2 is the public key of key recovery agent 2 for country X;

PUy1 is the public key of key recovery agent 1 for country Y;

PUy2 is the public key of key recovery agent 2 for country Y;

H(T1) is a 160-bit non-secret hash value;

T1 is the non-secret recovery information 610 (FIG. 9);

Px, Qx are the P and Q values "made available" to authorized key recovery agents for country X;

Py, Qy are the P and Q values "made available" to authorized key recovery agents for country Y;

Px', Qx', Py' and Qy' are the encrypted versions of Px, Qx, Py and Qy; and

SALT<for Px>, SALT<for Qx>, SALT<for Py>, SALT<for Qy> are 160-bit secret derived values.

Preferably, the encryption procedure used is the enhanced optimal asymmetric encryption (EOAE) procedure specified in the ANSI X9.44 RSA Key Transport draft standard and in D. B. Johnson and S. M. Matyas, "Enhanced Optimal Asymmetric Encryption: Reverse Signatures and ANSI X9.44", *Proceedings of the* 1996 *RSA Data Security Conference,* San Francisco, Calif., 1996, incorporated herein by reference. Other procedures, however, could be used instead.

H(T1) is a hash value calculated on the recovery information 610 (T1) using a public one-way hash function. H(T1) provides a form of "reverse signature" for the information in T1. A reverse signature strongly couples information to a secret. Whereas anyone can calculate a reverse signature, only users who know all the secrets inside the encrypted block (and can therefore recreate it using the public key) or who know the private key (and can thereby directly recover the secrets) can verify a reverse signature. Further information on reverse signatures may be found in the above-identified article of D. B. Johnson and S. M. Matyas.

SALT0 is 160-bit secret random value that either is specified as an additional input to the encryption procedure or is pseudorandomly generated from the secret session key K. The present invention permits the sender and receiver to establish a secret value for SALT0 independently of the session key K. For example, the parties may generate SALT0 using bits from the Diffie-Hellman procedure that are not used to generate the key K. Generating SALT0 independently of the session key K in this manner may provide added protection against certain kinds of cryptanalytic attacks.

If SALT0 is generated from the secret session key K, it is done so by hashing (K∥H(T1)∥Public Header) with SHA-1, where H(T1) is defined as above and Public Header is a 8-byte structure defined as follows:

1 byte Identifier: "salt0" ID 7 bytes Reserved: Set to 0

As used here or elsewhere in the specification, SHA-1 refers to the Secure Hash Algorithm (SHA-1), a cryptographically strong hashing algorithm. However, any suitable strong cryptographic hash function may be used instead of SHA-1.

SALT0 is used as an input to a public one-way function to generate additional salt values: SALT<for Px>, SALT<for Qx>, SALT<for Py>, and SALT<for Qy>. The one-way function makes it easy to calculate SALT<for Px>, SALT<for Qx>, SALT<for Py>, and SALT<for Qy>from SALT0, but computationally infeasible to generate SALT0 from any of these derived salt values.

The salts (SALT<for Px>, SALT<for Qx>, SALT<for Py>, and SALT<for Qy>) protect the encrypted P and Q values 602–608. The salt values (SALT<for Px>, SALT<for Qx>, SALT<for Py>, and SALT<for Qy>) are specifically constructed to be different. In the case where SALT0 is a secret random value specified as an input to the encryption procedure, this guarantees that every block to be encrypted for a key recovery agent has a dependency on SALT0 (a secret random 160-bit value independent of the key). In the case where SALT0 is pseudorandomly generated from the key, this guarantees that every block to be encrypted for a key recovery agent has a dependency on the entire key in a pseudorandom way.

H(T1) is included in the encrypted P and Q values 602–608 to provide a strong coupling of the recovery information 610 to the encrypted P or Q value, thereby providing the key recovery agents with a means for determining whether an encrypted P or Q value satisfies the stated conditions in a presented court order.

The encrypted P and Q values 602–608 also contain an indicator specifying whether the encrypted value is a P or Q value.

Figure 11:
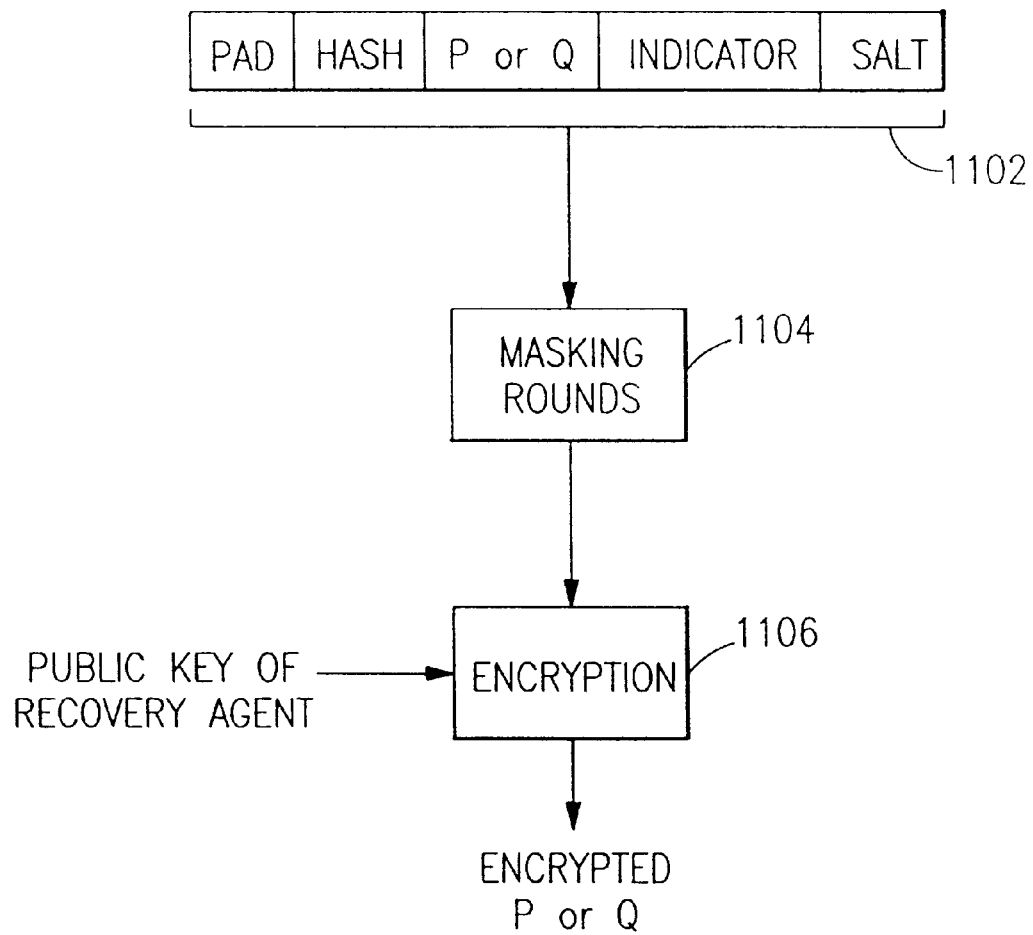
FIG. 11 is a schematic block diagram of the procedure for encrypting shared key recovery values.

Referring to FIG. 11, H(T1), the P or Q value, the indicator, and the salt are formatted in a block (1102), padded as necessary on the left with 0 bits, and encrypted with the public key of the key recovery agent, preferably using the enhanced optimal asymmetric encryption (EOAE) procedure described in the above-identified article of D. B. Johnson et al. As described in that article, the EOAE procedure contemplates first subjecting the formatted block 1102 to a plurality of masking rounds 1104 (in which one input half is alternatingly used to mask the other input half) before encrypting (1106) the result of the masking rounds.

The random-appearing salts used in the encrypted Px, Qx, Py, and Qy values are generated in a way which allows the receiver to verify that they are correct. As the receiver does not know the private keys belonging to the key recovery agents, this is done by encrypting the plaintext values with the public keys of the key recovery agents and comparing them for equality with the received values. This is made possible by deriving the salts in the encrypted Px, Qx, Py, and Qy values from SALT0.

Let Uv represent any one of the P and Q values in the set (Px, Qx, Py, Qy). The salt value used in the encryption of Uv, denoted Salt<for Uv>, is defined as the SHA-1 hash of the data (SALT0||Uv||Key Recovery Agent ID||Sender or Receiver ID||Public Header). The sender's ID is used if the salt is to be used in the encryption for the sender's key recovery agent. Otherwise, the receiver's ID is used. Public Header is an 8-byte structure defined as follows:

1 byte Identifier: "SALT" ID (for all Salts except SALT0)
1 byte Chain Value: 0, 1, etc. denoting the order of the encrypted block where there are many blocks.
1 byte Last Chain: The number of the last chain value.
5 bytes Reserved: Set to 0

With this approach, each of the derived salt values in the encrypted Px, Qx, Py, and Qy values appears independent; a corrupt key recovery agent cannot use a derived salt value to reduce the security of another encrypted P or Q value. In addition to supplying an authorized requester with a P or Q value, the key recovery agent can also supply the derived salt used so that the authorized requester can use the key recovery public key to verify that the correct decryption was done by the key recovery agent.

When the length of P or Q is >m (where m is the maximum length of P or Q that can be encrypted with the public key of the intended key recovery agent), the value (P or Q) is divided into blocks of m bits. The last block may be a short block. If there are "i" such blocks, then "i" different salt values are calculated, thereby ensuring that a different (but predictable) salt value is calculated for each of the m-bit blocks to be encrypted. For example, suppose that m=256 and the length of P is 512 bits. In that case, P is split into two blocks of size 256 bits and two salt values are calculated using the above described algorithm. The first salt value is calculated using a header in which the chain value is zero (0). The second salt value is calculated using a header in which the chain value is one (1). In this case, the two headers are equal except for the chain values. The "last chain" is the number of the last chain value. For example, if there are "i" blocks to be chained, then the "last chain" value is i−1. The "last chain" field ensures that all the encrypted blocks for a given chain can be accounted for.

Enhanced Optimal Asymmetric Encryption (EOAE) Procedure

The enhanced optimal asymmetric encryption (EOAE) procedure of the present invention differs from the earlier optimal asymmetric encryption (OAE) procedure of M. Bellare and P. Rogaway (described in the D. B. Johnson et al. article) in that the non-malleability bits in OAE are replaced by a hash of control information. In the present case, the non-malleability bits are replaced with H(T1), i.e., the hash of the recovery information (T1) 612 (FIG. 9).

The particular implementation of EOAE also differs from OAE in another respect. With OAE, an input X is processed by first appending a secret random number (RN) to it form X||RN, where the length of RN is equal to the length of the hash algorithm being employed (e.g., 128 for MD5 or 160 for SHA-1). However, the values of X to be encrypted by the key recovery system already have a secret random salt value as the rightmost (least significant) part of each X value. It is not necessary to append an additional secret random value to the input X. Thus, if X is the input to be processed with EOAE, then X is first rewritten as X=X'||Salt, where X' is the OAE input and Salt is the random number generated and appended to X' by OAE. Then X'||Salt is processed in the usual way with OAE (i.e., Salt is used as a seed to generate a masking value to mask X' and the masked X' is hashed with SHA-1 to generate a hash value which is used to mask Salt). Specific details of the masking portion of the EOAE and OAE processing can be found in the description of the shuffler function below.

Communication Scenarios

Various communication scenarios may be contemplated, as described below.

In many cases the mobile user will have to make recovery information available to agents of the end-users as well as the agents of the bases (i.e., the infrastructure functions connection the air-links and the wired network).

In a system where key distribution is performed using symmetric key cryptography, e.g., Kerberos, the same information could be stored and provide by a key distribution center (KDC). The KDC could also prepare the encrypted P and Q values. A special key recovery version of Kerberos would be required in order to perform the consistency checking on the encrypted P and Q values.

A multicasting scenario has one sender and many receivers. It may either be treated as a duplication of a single session, or as an aggregate of receivers. In the first case, each receiver will get a copy of the encryption to the sender's key recovery agents and encryptions to its own agents. In the second case, each receiver may get all the P, Q encryptions and will verify his own and the sender's. To aid with scalability, there may be an option to have special agents for multicasting purposes who will serve many countries.

Global Communications Policy Table

Referring to FIG. 12, the information required by the key recovery system of the present invention is stored in a table 1200 called the global communications policy table. Table 1200 is for illustrative purposes only. In an actual implementation the data would be stored appropriately, perhaps in separate tables, one specifying the key recovery agents' public keys and one specifying the rules. Table 1200 contains information allowing the system to calculate the sizes of the keys and P, Q and R for specific algorithms and users located in different countries. It may also contain the public keys of key recovery agents authorized for each country. The numbers in table 1200 are examples only to demonstrate the kind of flexibility the present invention permits. The variations are virtually unlimited. In particular, each country may have many key recovery agents.

For inter-country communications, the key recovery system can determine the receiver's country ID 908 (FIG. 9) from his public key certificate or comparable system configuration information. Using the sender's origin country ID and the receiver's destination country ID, and the algorithm ID of the intended encryption algorithm to be used by the sender and the receiver, the key recovery system will determine the following: (1) the maximum key length that the sender and the receiver can use, (2) the allowed R values, which can be different for the sender and the receiver, and (3) the required key recovery agent IDs needed by the key inversion function. The key recovery system then passes this information to the key inversion function. The key length is the smaller of the two key length values. For example, for countries X and Y the key values for DES are 64 and 128 bits, in which case 64 is the value used.

Interoperability with Other Systems

The "PQR" key recovery system of the present invention provides for limited interoperability between it and other, "non-PQR" systems. Thus, the sender 102 can send encrypted messages to the receiver 104: (1) if they each use PQR systems; (2) if they each use non-PQR systems; or (3) if the sender uses a PQR system and the receiver uses a non-PQR system. The sender cannot send encrypted messages to the receiver if the sender uses a non-PQR system and the receiver uses a PQR system. Basically, the receiver's PQR system will attempt to validate that the sender's system has created a valid PQR "key blob." Failing to do that, the receiver's PQR system will not make the key available to the receiver's application in a form that can be used to decrypt data received from the sender.

Key Recovery Procedure

An authorized law enforcement agent obtains a warrant or court order to access the encrypted data of a specific suspect for a specific period of time. The law enforcement agent accesses the encrypted information for the suspect, including any session contexts. The law enforcement agent can verify that the user ID(s) and date/time values are valid, that is, as specified in the warrant or court order. Other public information can also be validated as appropriate. The law enforcement agent gives the session context to the appropriate key recovery agents along with the warrant or court order.

The key recovery agent will verify the recovery information, including the user ID and date/time to ensure that all requirements of the warrant or court order have been met. This is done by checking the equality of the decrypted H(T1) and the hash of the received recovery information (T1). The key recovery agent then recovers the P or Q value and returns it and the associated salt to the law enforcement agent. The key recovery agents might also sign the decrypted information before releasing it, thereby attesting to the time and date when the key recovery was performed.

The law enforcement agent can verify that the key recovery agent returned the correct P or Q and salt values by re-creating the encrypted P or Q from the plaintext values. Once the law enforcement agent has assembled all the needed P and Q values, he or she can execute the key inversion function to recreate F(P,Q) and perform an exhaustive search on R to derive the key and decrypt the information. By requiring an exhaustive search on R, the cost of recovery of the key is not trivial, even if key recovery agents collude.

Implementation in Cryptographic System

Figure 13:
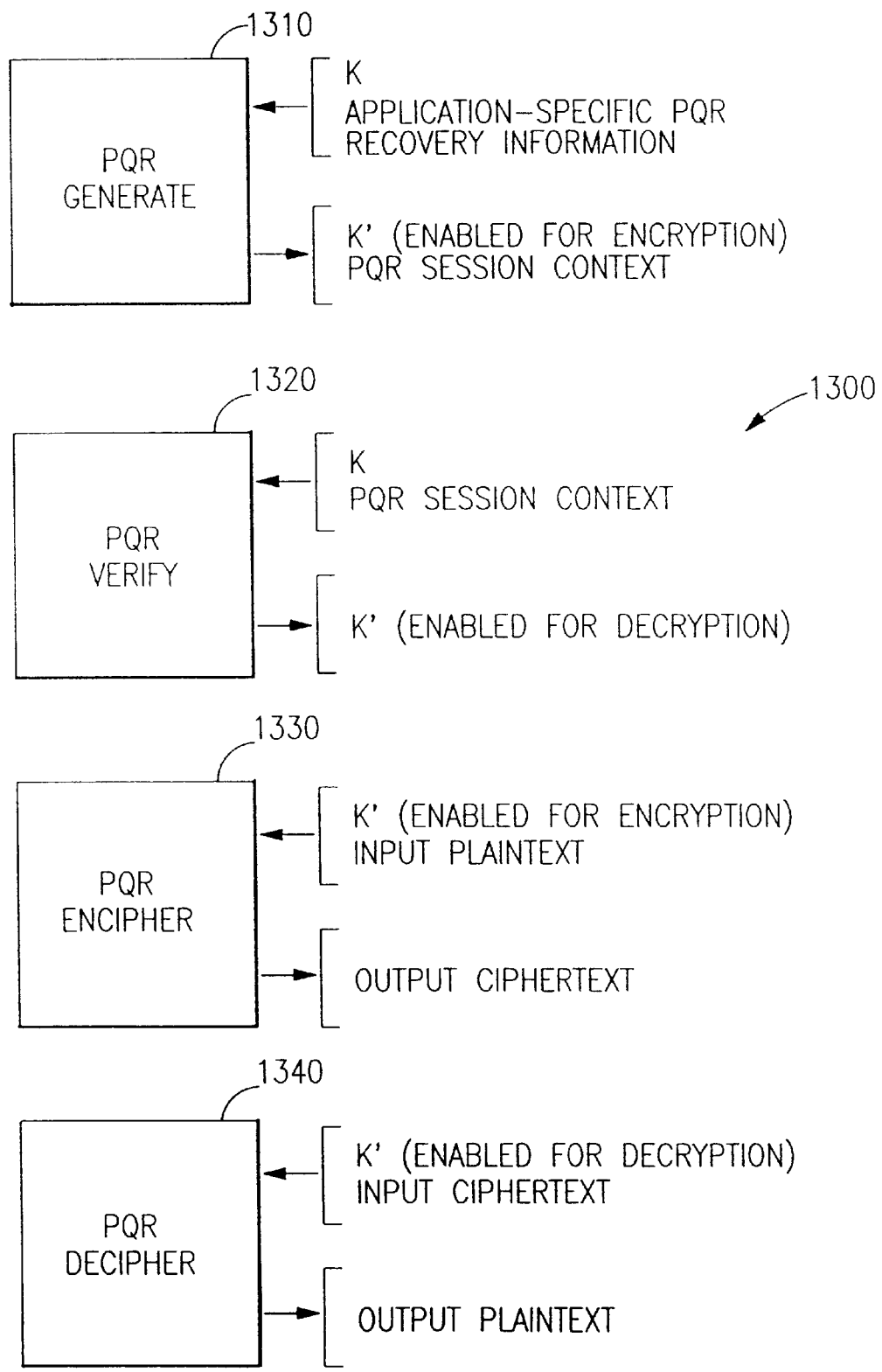
FIG. 13 is a schematic block diagram of a possible system implementation of the present invention.

FIG. 13 illustrates a possible implementation 1300 of the disclosed key recovery system within a cryptographic system. It is assumed that the key recovery system 1300 interacts with an encipher/decipher function called via an application programming interface (API). That is, the session or file key processed by the key recovery system 1300 is a data key that is enabled for use only in the encipher/decipher function. The enabling process is allowed only via the key recovery system 1300.

FIG. 13 shows four new cryptographic services: PQR Generate (1310), PQR Verify (1320), PQR Encipher (1330) and PQR Decipher (1340). PQR Generate service 1310 generates a set of P, Q and R values from an input key K. It also translates the key K into a form K' that will operate in the PQR Encipher service 1330. PQR Verify 1320 service verifies a set of P, Q and R values and, upon successful verification, translates the key K into a form K' that will operate in the PQR Decipher service 1340. PQR Encipher and Decipher services 1330 and 1340 are similar to the usual encipher and decipher data services, except that they require the input key to be in a special translated form recognized by the PQR Encipher and PQR Decipher services. The key K will not operate properly in the PQR Encipher and PQR Decipher services 1330 and 1340 unless it is first translated into the form K'.

Shuffler Function

Figure 14:
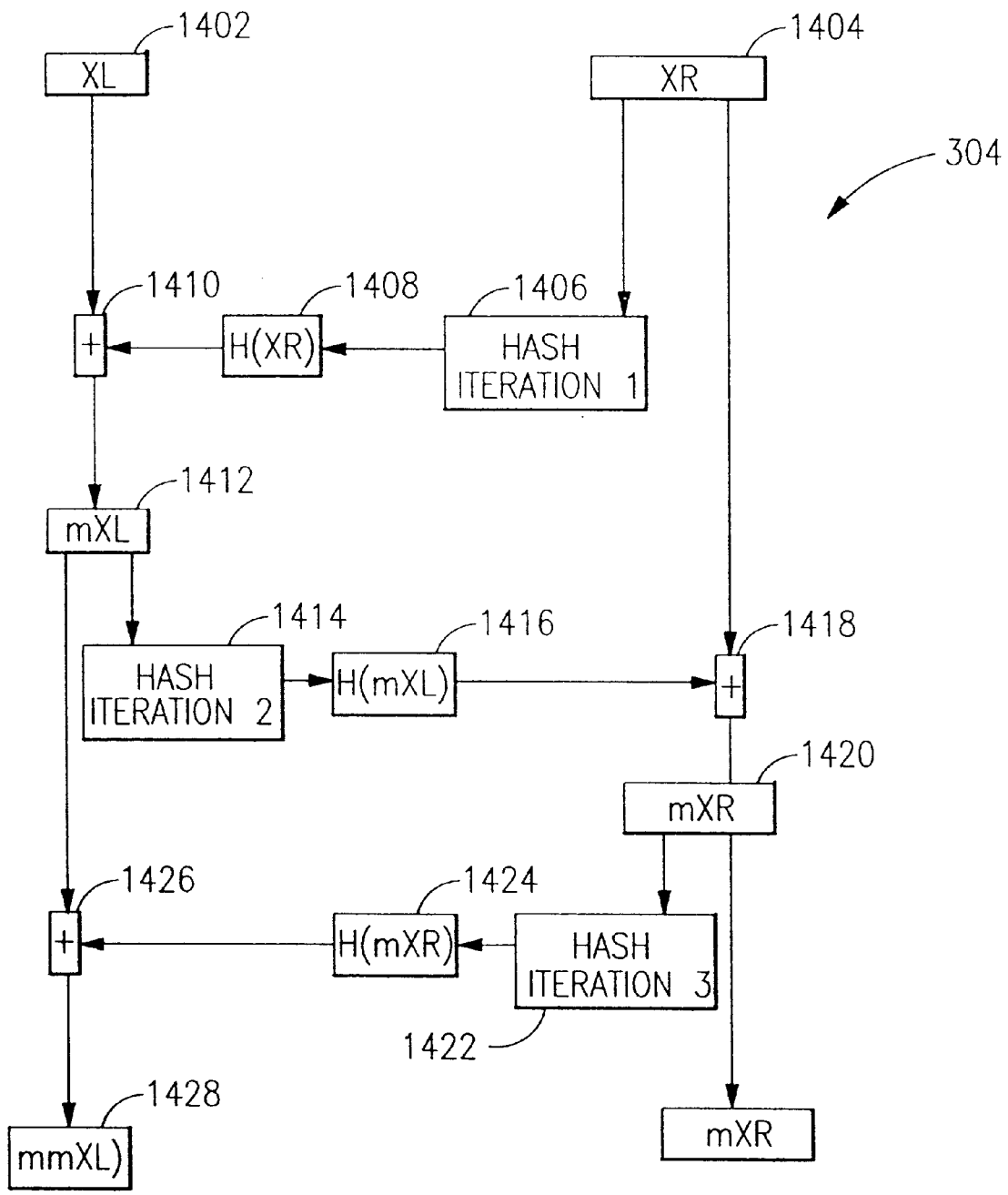
FIG. 14 is a schematic block diagram of the shuffler function used in the key inversion function of FIG. 3A.

FIG. 14 is a high-level block diagram of the shuffler function 304 used in key inversion function 300 (FIG. 3A). As noted above, shuffler function 304 transforms an n-bit input X into a "shuffled" n-bit output Y.

The n-bit input X (containing an even number of octets) is divided into a left half XL (1402) and right half XR (1404), where XL and XR each contain n/2 bits. In the particular example shown in FIG. 14, the bit lengths of XL (1402) and XR (1404) are the same as that of the hash value generated by the hash function used (160 bits). The procedure for XL and XR with other bit lengths is described further below.

At hash iteration 1, XR (1404) is hashed (1406) to produce a 160-bit hash value H(XR) (1408), which is Exclusive-ORed (1410) with XL (1402) to produce a once masked output mXL (1412). At hash iteration 2, mXL (1412) is hashed (1414) to produce a 160-bit hash value H(mXL) (1416), which is Exclusive-ORed (1418) with XR (1404) to produce a masked output mXR (1420). At hash iteration 3, mXR (1420) is hashed (1422) to produce a 160-bit hash value H(mXR) (1424), which is Exclusive-ORed (1426) with the once masked output mXL (1412) to produce a twice masked output mmXL (1428). The output Y consists of the twice masked output mmXL (1428) concatenated with the once masked output mXR (1420):

$$Y = mmXL \| mXR$$

Figure 15:
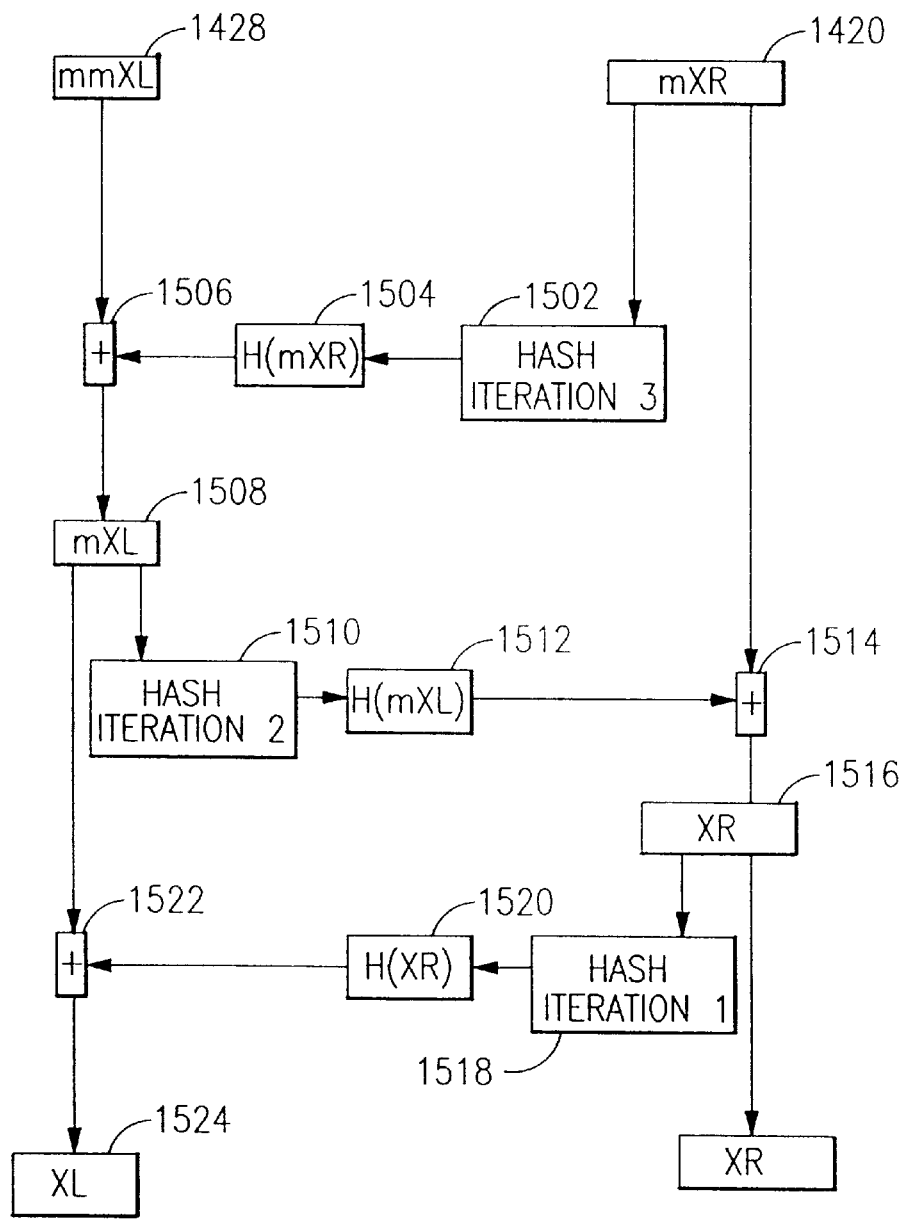
FIG. 15 is a schematic block diagram of the inverse of the shuffler function shown in FIG. 14.

FIG. 15 shows the inverse shuffler function 1500 for "unshuffling" mmXL 11 mXR to recover the original input XL∥XR. In inverse shuffler function 1500, the hash iterations 1–3 (1406, 1414, 1422) of shuffler function 304 are performed in the reverse order as hash iterations 3, 2 and 1. At hash iteration 3, mXR (1420) is hashed (1502) to recover the 160-bit hash value H(mXR) (1504), which is Exclusive-ORed (1506) with mmXL (1428) to recover mXL (1508). At hash iteration 2, mXL (1508) is hashed (1510) to recover 160-bit hash value H(mXL) (1512), which is Exclusive-ORed (1514) with mXR (1420) to recover the original input XR (1516). At hash iteration 1, XR (1516) is hashed (1518) to recover the 160-bit hash value H(XR) (1520), which is Exclusive-ORed (1522) with mXL (1508) to recover the original input XL (1524).

Processing for the case in which XL and XR do not each consist of 160 bits will now be described.

The procedure is generally as described above. The n-bit input X (containing an even number of octets) is divided into a left half XL and right half XR, where XL and XR each contain n/2 bits. XR is used to mask XL to produce a once masked XL, which is then used to mask XR. The masked XR is then used to further mask the once masked XL to produce a twice masked XL. However, XL and XR are each processed in successive chunks to accommodate the block size of the hashing algorithm.

Figure 16:
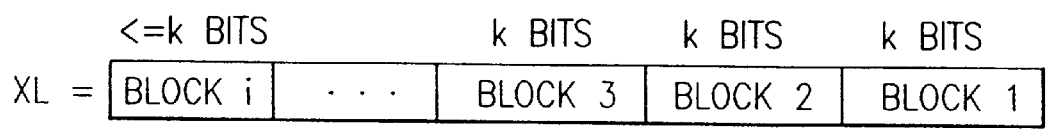
FIG. 16 is a schematic block diagram of the manner of subdivision of one of the blocks used in the shuffler function shown in FIG. 14.

Referring to FIG. 16, to mask XL using XR, XL is first divided into i blocks of k or fewer bits, where k is defined as the block size of the hash algorithm. For example, if SHA-1 is the hash algorithm, then k=160. If MD5 is the hash algorithm, then k=128. Unless otherwise stated in this specification, SHA-1 will be the hash algorithm employed by the shuffler function. If n is a multiple of k, then each block contains k bits. If n is not a multiple of k, then XL will consist of one short block i (<k bits) and optionally one or more blocks of k bits. If a short block exists, it is constructed from the most significant bits of XL.

The input to be hashed is defined as follows:

Input XR‖Public Header where Public Header is an 10-byte encoded structure as follows:

1 byte Identifier: "shuffler" ID
4 bits Iteration: 1=first iteration
4 bits Algorithm: ID of hashing algorithm
4 bytes Counter: 1, 2, etc. The counter matches the block number in XL to be masked.
4 bytes Length: key length in bits (also indicates whether 0 pad for k=odd was performed). The maximum key length per header is $2^{32}$ bits.

The masking operation is performed as follows. The counter is initially set to 1, and Input (XR‖Public Header) is hashed with SHA-1 to produce a 160-bit hash Hi. Hi is XORed with block 1 from XL to produce the masked block 1 (denoted mblock 1). The counter is then incremented to 2, and the Input (XR‖Public Header) is hashed with SHA-1 to produce a 160-bit hash H2. H2 is XORed with block 2 from XL to produce the masked block 2 (denoted mblock 2).

The operation continues in this manner until the last block (block i) has been masked. If the last block is a short block containing j bits (j<k), then block i is masked by Exclusive ORing the least significant j bits of Hi with block i to produce the masked block i (denoted mblock i). The masked XL (consisting of the concatenation of masked blocks 1–i) is denoted mXL.

The masking of XR using the masked XL (denoted mXL) is performed in a similar manner. XR is divided into blocks in the same way that XL was divided. The actual masking operations are also carried out in the same way, except that the iteration number in the public header is set to 2 (denoting "second iteration"). In this case the public header is post-fixed to mXL.

The input to be hashed is

Input=mXL‖Public Header where the iteration number in the public header is set to 2 to denote "second iteration". The counter is reset and increments as before, 1, 2, etc. The masking operation consists of hashing the input and Exclusive ORing the so-produced hash values with the blocks in XR. The masked XR (consisting of the concatenation of masked blocks 1–i) is denoted mXR.

The value mXL is masked with mXR in the same way that XL was masked with XR except that the Iteration Number in the public header is set to 3 (denoting "3rd iteration"). The masked mXL is denoted mmXL.

The output of the shuffler is mmXL‖mXR.

Public Headers

Each public header described in this specification has a one-byte identifier field. The identifier fields are defined as follows:

X'01' "Salt0"
X'02' "Salt" other than Salt0
X'03' "PQ Key Recovery Agent IDs"
X'04' "Shuffler"

Miscellaneous

It is contemplated that the public key certificate for each user will adhere to the X.509 version 3 Certificate Standard and that a v3 extension will be capable of holding certain needed information about the key recovery procedure, such as user ID, country ID, first key recovery agent ID and second key recovery agent ID. It is also contemplated that the sender's as well as the receiver's public key certificates will be made available to the key recovery system. Thus, when the public keys of the users are made available for the purpose of effecting key distribution, the necessary information to perform key recovery will also become available, and can be validated. The certificate seems the natural place to carry this information. By incorporating a user's key recovery information in his or her public key certificate, there is less opportunity for a user to misuse the recovery system, e.g., by claiming a different country ID with more favorable key recovery options.

Attacks

Several types of attacks on the disclosed key recovery system may be contemplated. Some of these are based on corrupt key recovery agents.

If a single key recovery agent is corrupt and reveals the P value for a user, this would not pose a problem, since the Q value is still unknown to the attacker. Not knowing Q or R would still present the attacker with a problem equivalent to that of determining the entire key. This partial recovery solution is therefore preferable to a scheme where the entire key is recovered by the key recovery agents.

A corrupt key recovery agent is prevented from using the salt value associated with an encrypted P or Q to attempt to analyze another encrypted P or Q as each salt is derived by passing SALT0 through a one-way function. Each salt therefore appears independent.

In the case of (n−r) being a small value, a corrupt agent might want to try all forward shufflings across all of F(Px, Qx) to find a match to their decrypted P. This attack is blocked by the inclusion of F(P,Q,R) in the derivation of Hx.

Other attacks are based on corrupt users. If both the sender 102 and the receiver 104 are corrupt, they can use their own encryption methods or bypass any software system checks. The present invention does not seek to thwart an attack where both users are corrupt. This is a fundamental simplifying assumption.

If the sender 102 is corrupt and does not send the key recovery information 610 (FIGS. 6, 9), the receiver 104 will not be able to validate them. By detecting a corrupt transmission, the decryption process will not be enabled.

If the receiver 104 is corrupt and does not verify the key recovery values, the sender 102 still has transmitted them, allowing them to be accessed as needed.

Dynamic and frequent sessions limit the cryptoperiod and help ensure that a session context is available for access.

Further attacks may also be contemplated. One is the so-called "squeezing attack". Y. Frankel and M. Yung, in "Escrow Encryption Systems Visited: Attacks, Analysis and Designs", *Crypto '95 Conference Proceedings,* Aug. 1995, have shown how to transport keys between sessions so that the session header can be identified with other users. To avoid such attacks, it is recommended that users use active key distribution methods (e.g., based on Diffie-Hellman key exchange) when they are worried about the key being misused. They may sign the exchange, the session information, the parties' IDs, and messages in their session to identify them with the source so that they are not to be opened by the recovery agents unless the users themselves are under wiretapping. This will provide binding of messages with their source, assuring the fact that messages from a source not under the wiretapping is not considered valid as is required by the minimization principle in tapping (i.e. listening only to the suspects). Some applications should also require the other party to sign the session header, etc. for assuring the authenticity of the two end-points. These communication applications are protected as the signatures are uniquely produced by the two parties.

Replication of the agent's key by a "faked agent" enables certain attacks. It is therefore assumed that the table of agent's keys contains keys that are verified to belong to the actual agent in an actual country.

Also, "non-fresh" keys may be inserted in key management procedures. It is therefore recommended that the session ID in interactive applications be derived from "fresh information" or the time/date. When a proper "key distribution" mechanism is used, it by itself will assure freshness. In the non-interactive version, the session ID may be derived from and relate to the date and time and may be checked by the receiver's application (based on the expected delay anticipated by the application).

As for how much the encryption for the key recovery helps an attacker in the pre-established key scenario, the public key encryptions under the agents' keys are all made different and made to depend on either a SALT0 which is a 160-bit random value and some part of the key, or depend on the "entire key" via the pseudorandom derivation of the salts in the case where the key is the only input to the process. This gives assurance that, as far as is understood, the encryptions to the agents do not introduce a "search space" for an attacker which is smaller than the key itself. The variability and the use of optimal asymmetric encryption assures that the various cleartexts to the agents are pseudo-randomly independent from each other.

Conclusion

The advantages of the present key recovery system bear repeating. It supports multiple algorithms. It supports any key distribution procedure and provides one when lacking. It supports multiple key recovery agents. It supports multiple countries; the special requirements of a country can be handled. It is self-enforcing; the receiver validates the values "made available" to the key recovery agents. In contrast to using exportable encryption (e.g., 40 bit key), the user gets stronger encryption key strength to all but a authorized entity at the cost of the user's system doing more work; the user gets the maximum strength that complies with the law. Law enforcement can verify that a key recovery agent gives them the correct information; this helps allay fears of a key recovery agent that is not completely trusted. Whereas in a key escrow system based on sending encrypted keys to an escrow agent the cost is proportional to the number of sessions, in the present system the cost is proportional to the number of accesses.

The keys "made available" are session level keys. This provides compartmentalization and appropriate access. Compartmentalization means that there is a natural limitation of the key in time which will correspond closely with the time period of an authorized key recovery. Appropriate access means that the key needed to reveal the encrypted data is recovered, not a more permanent key or a key for another user. In contrast, recovering the private keys of a public key algorithm is not a good idea, as it gives access to encrypted messages received from others instead of messages sent to others. It also forces these normally long-life keys to roll-over frequently in order to enforce appropriate compartmentalization. Further information on this topic may be found in the above-identified publication of Frankel and Yung, incorporated herein by reference.

Various modifications of the invention will be apparent to those skilled in the art. The invention may be implemented as hardware, as software, or as some combination of the two. The shuffling, hashing and encryption procedures used may differ from the ones described in the specification above. Modifications that include additional strings and constants are also possible. Still other modifications will occur to those skilled in the art.

What is claimed is:

1. A method of providing, in a manner verifiable by a possessor of a cryptographic key, for the recovery of said key using a plurality of cooperating key recovery agents, comprising the steps of:

receiving a plurality of shared key recovery values from which said key may be recovered, said key being recoverable from said plurality of shared key recovery values collectively by combining them to recover said key but not being recoverable from any single shared key recovery value individually, said key recovery values being generated as a function only of said key and public information and being encrypted under respective keys of said key recovery agents to generate encrypted recovery values;

generating said shared key recovery values from said cryptographic key and said public information;

encrypting said generated shared key recovery values under said encryption keys of said key recovery agents to generate comparison encrypted recovery values; and comparing said received encrypted recovery values with said comparison encrypted recovery values to verify said received encrypted recovery values.

2. The method of claim 1 in which a pair of communicating parties use said cryptographic key to intercommunicate.

3. The method of claim 2 in which said cryptographic key is established by one of said parties and communicated to the other of said parties.

4. The method of claim 1 in which said cryptographic key is established by both of said parties acting in concert.

5. The method of claim 1 in which said cryptographic key is completely determined by said shared key recovery values.

6. The method of claim 1 in which said generating step comprises the steps of:

generating a first input value as a first invertible function of said cryptographic key;

concatenating at least a portion of said first input value with a second input value to generate a lengthened input value;

generating an output value as a second invertible function of said lengthened input value; and partitioning said output value into subportions to create said shared key recovery values.

7. The method of claim 6 in which said second input value is generated as a function of said cryptographic key.

8. The method of claim 6 in which said first invertible function is a pseudorandom function.

9. The method of claim 6 in which said first invertible function is such that each bit of said first input value depends on each bit of said cryptographic key.

10. The method of claim 6 in which said second invertible function is a pseudorandom function.

11. The method of claim 6 in which said second invertible function is such that each bit of said output value depends on each bit of said lengthened input value.

12. The method of claim 6 in which all of said first input value is concatenated with said second input value to generate said lengthened input value.

13. The method of claim 6 in which said first invertible function is a non-pseudorandom function.

14. The method of claim 6 in which said first input value comprises said key.

15. Apparatus for providing, in a manner verifiable by a possessor of a cryptographic key, for the recovery of said key using a plurality of cooperating key recovery agents, comprising:

means for receiving a plurality of shared key recovery values from which said key may be recovered, said key being recoverable from said plurality of shared key recovery values collectively by combining them to recover said key but not being recoverable from any single shared key recovery value individually, said key recovery values being generated as a function only of said key and public information and being encrypted under respective keys of said key recovery agents to generate encrypted recovery values;

means for generating said shared key recovery values from said cryptographic key and said public information;

means for encrypting said generated shared key recovery values under said encryption keys of said key recovery agents to generate comparison encrypted recovery values; and means for comparing said received encrypted recovery values with said comparison encrypted recovery values to verify said received encrypted recovery values.

16. The apparatus of claim 15 in which said generating means comprises:

means for generating a first input value as a first invertible function of said cryptographic key;

means for concatenating at least a portion of said first input value with a second input value to generate a lengthened input value;

means for generating an output value as a second invertible function of said lengthened input value; and means for partitioning said output value into subportions to create said shared key recovery values.

17. The apparatus of claim 16 in which said first input value comprises said key.

18. A program storage device readable by a machine, tangibly embodying a program of instructions executable by the machine to perform method steps for providing, in a manner verifiable by a possessor of a cryptographic key, for the recovery of said key using a plurality of cooperating key recovery agents, said method steps comprising:

receiving a plurality of shared key recovery values from which said key may be recovered, said key being recoverable from said plurality of shared key recovery values collectively by combining them to recover said key but not being recoverable from any single shared key recovery value individually, said key recovery values being generated as a function only of said key and public information and being encrypted under respective keys of said key recovery agents to generate encrypted recovery values;

generating said shared key recovery values from said cryptographic key and said public information;

encrypting said generated shared key recovery values under said encryption keys of said key recovery agents to generate comparison encrypted recovery values; and comparing said received encrypted recovery values with said comparison encrypted recovery values to verify said received encrypted recovery values.

19. The program storage device of claim 18 in which said generating step comprises the steps of:

generating a first input value as a first invertible function of said cryptographic key;

concatenating at least a portion of said first input value with a second input value to generate a lengthened input value;

generating an output value as a second invertible function of said lengthened input value; and partitioning said output value into subportions to create said shared key recovery values.

20. The program storage device of claim 19 in which said first input value comprises said key.

\* \* \* \* \*